US012428889B2

(12) United States Patent
Andersson

(10) Patent No.: US 12,428,889 B2
(45) Date of Patent: Sep. 30, 2025

(54) SLIDING SCREEN SLIDING SYSTEM

(71) Applicant: Inter IKEA Systems B.V., Delft (NL)

(72) Inventor: Benny Andersson, Ålmhult (SE)

(73) Assignee: Inter IKEA Systems B.V., Ln Delft (NL)

( * ) Notice: Subject to any disclaimer, the term of this patent is extended or adjusted under 35 U.S.C. 154(b) by 740 days.

(21) Appl. No.: 17/535,999

(22) Filed: Nov. 27, 2021

(65) Prior Publication Data

US 2022/0081947 A1 Mar. 17, 2022

Related U.S. Application Data

(63) Continuation of application No. 15/757,543, filed as application No. PCT/EP2016/071059 on Sep. 7, 2016, now Pat. No. 11,187,020.

(30) Foreign Application Priority Data

Sep. 7, 2015 (SE) .................................... 1551138-9
Jul. 13, 2016 (SE) .................................... 1651048-9
Jul. 13, 2016 (SE) .................................... 1651049-7

(51) Int. Cl.
*E05D 15/06* (2006.01)
*A47H 1/04* (2006.01)
*A47H 15/04* (2006.01)

(52) U.S. Cl.
CPC ........... *E05D 15/0647* (2013.01); *A47H 1/04* (2013.01); *A47H 15/04* (2013.01);
(Continued)

(58) Field of Classification Search
CPC ......................... E05D 15/0647; E05D 15/0656
See application file for complete search history.

(56) References Cited

U.S. PATENT DOCUMENTS 1,071,006 A 8/1913 Little
2,441,721 A 5/1948 Schroeder
(Continued)

FOREIGN PATENT DOCUMENTS

CA 2437147 A1 2/2005
CA 2215925 C 9/2008
(Continued)

OTHER PUBLICATIONS

J. Stepek and H. Daoust, Additives for Plastics, Polymer Properties and Applications 5, Springer Science + Business Media, LLC, Dec. 1982.

(Continued)

*Primary Examiner* — Catherine A Kelly
(74) *Attorney, Agent, or Firm* — Renner, Otto, Boisselle & Sklar, LLP.

(57) ABSTRACT

A sliding screen system for a sliding screen comprising a linear slide bar and at least one sliding member. The linear slide bar has a slide surface coated with a lacquer comprising a resin. The lacquer is in turn at least partly coated with a lipophilic composition coating. The lipophilic composition coating provides a slide layer on the slide bar with low friction. The sliding system is arranged to support a sliding screen, such as a sliding door or a sliding curtain, connected to the sliding member to allow for linear movement of the sliding screen along the longitudinal axis of the linear slide bar.

20 Claims, 8 Drawing Sheets

(52) U.S. Cl.
CPC ..... *E05D 15/0652* (2013.01); *E05D 15/0682* (2013.01); *E05Y 2900/132* (2013.01)

(56) References Cited

U.S. PATENT DOCUMENTS 2,627,447 A 2/1953 Cook
2,720,316 A 10/1955 Glascott
3,047,934 A * 8/1962 Magner, Jr. ........... F16C 33/205 156/324
3,139,313 A 6/1964 Rule
3,221,677 A 12/1965 Kerr
3,457,676 A * 7/1969 Ziegler ............... E05D 15/0647 16/93 R
3,457,677 A * 7/1969 Ziegler ............... E05D 15/0647 16/93 R
3,615,144 A * 10/1971 Plemeng ............. E05D 15/0647 49/411
3,622,473 A 11/1971 Ohita et al.
3,755,093 A * 8/1973 Suematsu .............. C25D 13/00 525/380
3,760,744 A 9/1973 Cruckshank
3,916,802 A 11/1975 Virtue
4,036,369 A 7/1977 Eisenberg
4,138,176 A 2/1979 Cowdroy
4,286,525 A 9/1981 Willmore
4,297,952 A 11/1981 Zagaroli
4,455,709 A * 6/1984 Zanini ................. E05D 15/0656 49/411
4,500,146 A 2/1985 Peterson
4,637,081 A 1/1987 Clark
4,713,949 A 12/1987 Wilcox
4,833,848 A * 5/1989 Guerin .................. E04B 2/7401 403/295
4,868,935 A * 9/1989 Van Weelden ........... A47K 3/34 16/93 R
5,064,547 A * 11/1991 Rubin .................. C10M 107/34 508/506
5,085,524 A 2/1992 Reiss
5,101,524 A 4/1992 Brandschain
5,171,622 A 12/1992 Wegner
5,263,384 A 11/1993 Motohiko
5,290,058 A 3/1994 Adams et al.
5,325,732 A 7/1994 Vogel
5,549,377 A 8/1996 Krivec
5,735,610 A 4/1998 Mark et al.
5,981,448 A 11/1999 Matsui et al.
5,992,496 A * 11/1999 Lee ......................... E05D 15/26 160/199
6,004,909 A 12/1999 Lindman
6,225,404 B1 5/2001 Sorensen et al.
6,520,092 B2 2/2003 Marshall
6,822,014 B2 11/2004 Katou
6,854,402 B2 2/2005 Dubarry
6,855,676 B2 * 2/2005 Li ...................... C10M 173/025 508/250
6,877,826 B2 4/2005 Wood
7,398,737 B1 7/2008 Martellaro
7,653,966 B2 * 2/2010 Quinn ................. E05D 15/0647 16/93 R
7,780,254 B2 8/2010 Wang
7,987,799 B2 8/2011 Lange
8,418,318 B2 4/2013 Scharf et al.
9,532,659 B2 * 1/2017 Tsui .................... E05D 15/0643
10,077,934 B1 9/2018 Dizon
10,113,347 B2 * 10/2018 Wolfe ................. E05D 15/0656
10,844,906 B2 * 11/2020 Andersson ........... C10M 129/95
11,187,020 B2 * 11/2021 Andersson .......... E05D 15/0647
11,578,754 B2 * 2/2023 Andersson .............. B32B 15/08
2003/0013615 A1 1/2003 Levy
2003/0213698 A1 11/2003 Kawagoshi et al.
2004/0096129 A1 5/2004 Schmalzhofer
2006/0231218 A1 * 10/2006 Liang ...................... E05D 15/26 160/206
2007/0261198 A1 11/2007 Vogler
2008/0125338 A1 5/2008 Corbett et al.
2008/0159671 A1 * 7/2008 Leonardelli ........... F16C 33/201 508/108
2011/0177987 A1 * 7/2011 Lenting ............... C03C 17/3405 508/204
2012/0240350 A1 9/2012 Natu et al.
2014/0157677 A1 6/2014 Walawender et al.
2014/0208654 A1 * 7/2014 Anderson ........... E05D 15/0647 49/410
2014/0255656 A1 9/2014 Suzuki et al.
2015/0361274 A1 * 12/2015 Domes .................... C23C 22/83 427/515
2016/0106221 A1 4/2016 Gardner
2016/0319211 A1 * 11/2016 Barth ................. C10M 169/047
2018/0335078 A1 * 11/2018 Andersson .......... E05D 15/0647
2019/0017306 A1 * 1/2019 Romero ................. A47K 3/362
2020/0071631 A1 * 3/2020 Andersson ........... C10M 129/20

FOREIGN PATENT DOCUMENTS

CH 334983 A 12/1958
CN 1090593 A 8/1994
CN 1223675 7/1999
CN 2481814 Y 3/2002
CN 1385482 12/2002
CN 2542785 Y 4/2003
CN 101035959 A 9/2007
CN 201079158 Y 7/2008
CN 201190490 Y 2/2009
CN 201230725 U 5/2009
CN 201491997 U 6/2010
CN 102307499 A 1/2012
CN 202128137 U 2/2012
CN 202436824 U 9/2012
CN 103555177 A 2/2014
CN 103573075 A 2/2014
CN 103867062 6/2014
CN 104154118 A 11/2014
DE 1112266 B 8/1961
DE 1954506 2/1967
DE 3613313 A1 10/1987
DE 29611949 U1 9/1996
DE 29813478 U1 11/1998
DE 19924642 C2 5/1999
DE 20111930 U1 10/2001
DE 102011053946 A1 3/2013
EP 985793 A2 3/2000
EP 1568299 B1 8/2005
EP 1153560 10/2010
EP 2957784 A1 12/2015
FR 1467583 A 1/1967
FR 2254222 A5 * 7/1975
GB 1126855 A 9/1968
GB 1383645 2/1975
GB 1415100 A 11/1975
GB 2386929 A 10/2003
JP 57173666 A 10/1982
JP 576447 3/1993
JP 106136304 5/1994
JP 2003268194 9/2003
JP 2005042304 A 2/2005
JP 2006062328 A 3/2006
SU 1690664 11/1991
WO 1994024912 11/1994
WO 1999047824 A1 9/1999
WO 2006022669 A1 3/2006
WO 2015051892 A1 4/2015
WO 2017044034 A1 3/2017
WO 20171042203 A1 3/2017
WO 20171042228 A1 3/2017
WO 20171044032 A1 3/2017

OTHER PUBLICATIONS

Roleira, F M F et al, Lipophilic phenolic antioxidants: Correlation between antioxidant profile, partition coefficients and redox prop

(56) References Cited

OTHER PUBLICATIONS erties, Bioorganic & Medicinal Chemistry, Elsevier, ML, vol. 18, No. 16, Aug. 15, 2010, pp. 5816-5825.
M.J. Furey et al, The Effect of Lubriccant Viscosity on Metallic Contact and Friction in a Sliding System, vol. 5, No. 1, Jan. 1, 1962, pp. 149-159, XP055745398.
Anonymous, Standard Test Method for Total Iodine Value of Drying Oils and Their Derivatives (D 1541-97), withdrawn, Jan. 1, 1997, pp. 1-4, XP055745437, retrieved from the internet: www.astm.org on Oct. 30, 2020.
Anonymous, Regulation (EC) No. 1935/2004 of the European Parliament And of the Council of Oct. 27, 2004 on materials and articles intended to come into contact with food and repealing Directives 80/590/EEC and 89/109/EEC, Official Journal of the European Union, Nov. 13, 2004, pp. 1-14, XP055745458.
Anonymous, Liquid Petroleum or "Russian Mineral Oil", Journal of Pharmaceutical Sciences, vo. 3, No. 7, Jul. 1, 1914, pp. 1013-1018, XP055745484, ISSN: 0898-140X, DOI: 10.1002/jps.3080030718.
Loehle et al. "Mixed Lubrication with C18 Fatty Acids: Effect of Unsaturation", Tribology Letters, 2014, vol. 53, pp. 619-328.
Greenlaw, "I use coconut oil instead of a spray lubricant as much as possible, especially near food", Pinterest 111, Nov. 1, 2014 (Nov. 1, 2014) XP055315462, Retrieved from the Internet: URL:https:jnl.pinterest.com/pin/395331673512857041/[retrieved on Nov. 1, 2016].
Table of Aluminum hardnesses—Nov. 29, 2019 (Year:2019).
Hussein et al., "Enhancement of the Wear Resistance and Microhardness of Aluminum Alloy by Nd:YaG Laser Treatment," The Scientific World Journal,, vol. 2014,Article ID 842062, pp. 1-5.

* cited by examiner

SLIDING SCREEN SLIDING SYSTEM

FIELD OF THE INVENTION

The present invention relates to a sliding screen sliding system, the sliding system comprising a slide bar having a sliding surface with low friction. Further, the invention relates to a sliding screen arrangement comprising such a sliding system.

BACKGROUND

Wardrobes having sliding doors are well-known in the art (cf. e.g. DE 298 13 478). Typically, the doors are arranged with supportive ball bearings, e.g. wheels rolling over a rail, at the upper end of the door and steering means, e.g. pins, at the lower. Ball bearings are working well, but suffer from being somewhat dust sensitive. Further, the start-stop resistance is very low if the doors are to be easily moveable; an inherent feature of ball bearings. At the end-positions, this may be partly overcome by providing resting end-positions provided with e.g. heads or recesses, for the wheels. However, this would not overcome the low start-stop resistance at intermediate positions. This type of problem is even more pronounced in heavier doors, such as glass doors that are used for patio doors and patio windows of glazed-in patios, and glass doors and glass windows of glazed-in balconies.

Sliding kitchen doors, being less heavy than wardrobe sliding doors, are typically not provided with ball bearings, but are mounted standing in a sliding groove, i.e. a linear plain bearing. For lighter doors this may work well, though the sliding resistance may be fairly high; especially at start. However, for heavier doors, e.g. wardrobe sliding doors, linear plain bearings typically provide too high sliding resistance for practical use; especially at start. Further, such linear plain bearings are sensitive to dust contamination affecting the sliding resistance very negatively.

Curtains represent another type of sliding screens. Also in this application there is a need for low sliding resistance, especially a low start resistance.

Given its simplicity, it would be desired to provide a linear slide bar with very low sliding friction for use in sliding screen sliding systems.

SUMMARY

Consequently, the present invention seeks to mitigate, alleviate, eliminate or circumvent one or more of the above identified deficiencies and disadvantages in the art singly or in any combination by providing a sliding screen sliding system, comprising a linear slide bar having a slide surface coated with a lacquer comprising a resin, the lacquer in turn is at least partly coated with a lipophilic composition coating to provide a slide layer with lowered friction, and at least one sliding member. This provides for a low friction slide bar with efficient function in sliding screen systems. The linear slide bar and the sliding member are arranged in contact and the interface between the slide layer of the slide bar and the sliding member forms a linear plain bearing to allow for linear movement of the sliding member along the longitudinal axis of the linear slide bar. The sliding member is provided with a fastening arrangement adapted for connection to a sliding screen to allow for linear movement of the sliding screen along the longitudinal axis of the linear slide bar.

According to an aspect of the invention, the part of said sliding member to slide over the slide layer is configured as a blade extending in the sliding direction. The slide layer may arranged at a track, e.g. a groove or a hill, extending along the longitudinal axis of the slide bar. Presence of a track improves the control of the lateral position of the sliding member in relation to the slide bar when the sliding member slides along the slide bar.

According to an aspect of the invention, the slide bar may be an aluminum or steel bar. The slide surface may be lacquered by electrocoating or autodeposition in a bath containing the lacquer, or by electrostatic coating with a powder lacquer or by wet spraying with a liquid lacquer. At least the part of the sliding member being in contact with the slide layer may be made of a plastic. The slide bar may be a linear, preferably anodized, aluminum profile, having a surface layer onto which the lacquer has been applied. The thickness of the anodized oxide surface layer may be at least 5 micrometers, preferably at least 10 micrometers. The surface layer may be electrophoretically, such as anaphoretically, coated with an acrylic resin and subsequently heat cured to form the lacquer.

According to a preferred aspect, the lipophilic composition coating comprises compounds comprising C6 to C40, such as C8 to C30, or even C10 to C24, non-aromatic hydrocarbyl groups, such as alkenyl groups and/or alkyl groups, e.g. alkyl groups.

According to another aspect of the invention there is provided a sliding screen arrangement comprising the sliding system and a sliding screen. The sliding member is arranged to support the sliding screen to allow for linear movement of the sliding screen along the longitudinal axis of the linear slide bar. The sliding screen may be a sliding door or a sliding curtain.

According to another aspect of the invention there is provided an alternative sliding screen sliding system comprising at least one sliding member having a slide surface coated with a lacquer comprising a resin, wherein said lacquer in turn is at least partly coated with a lipophilic composition coating to provide a slide layer with lowered friction, and a linear slide bar. The linear slide bar and the sliding member are arranged in contact, whereby the interface between sliding member and the linear slide bar forms a linear plain bearing to allow for linear movement of the sliding member along the longitudinal axis of the linear slide bar. The sliding member is provided with a fastening arrangement adapted for connection to a sliding screen to allow for linear movement of the sliding screen along the longitudinal axis of the linear slide bar.

Further advantageous features of the invention are elaborated in embodiments disclosed herein. In addition, advantageous features of the invention are defined in the dependent claims.

BRIEF DESCRIPTION OF THE DRAWINGS

The above and other aspects, features and advantages of which the invention is capable of will be apparent and elucidated from the following description of the present invention, reference being made to the accompanying drawings, in which.

DETAILED EMBODIMENTS

The present inventors have surprisingly found that coating a surface lacquered with a resin, for example an acrylic resin, with a lipophilic composition, such as for example sebum (natural or artificial), coconut oil, liquid paraffin, etc., provides a slide layer with extremely low friction (sliding resistance). The application of the lipophilic composition reduces the dynamic friction with as much as 75%. Further, and even more surprisingly, the effect is not temporarily, but seemingly permanent or at least very long-lasting. The need to replenish the lubricant may hence be dispensed with.

In experiments employing aluminum profiles having been anaphoretically coated with an acrylic resin subsequently heat cured to form a lacquer (cf. the Honny process, initially disclosed in GB 1,126,855), wherein the lacquer of the aluminum profiles was coated with sebum, the friction remained nearly the same after more than 70,000 test cycles of a sliding door being reciprocated along the profile. So many cycles by far exceed the expected number on lifetime cycles. Further, washing the coated aluminum profile with water/detergent, ethanol, and/or iso-propanol didn't affect the friction. Without being bond to any theory, it seems that the sebum coating provides an irreversibly bound lubricant coating on top of the lacquer comprising the acrylic resin. Further, the lacquer seems to be important in providing low friction.

Figure 1:
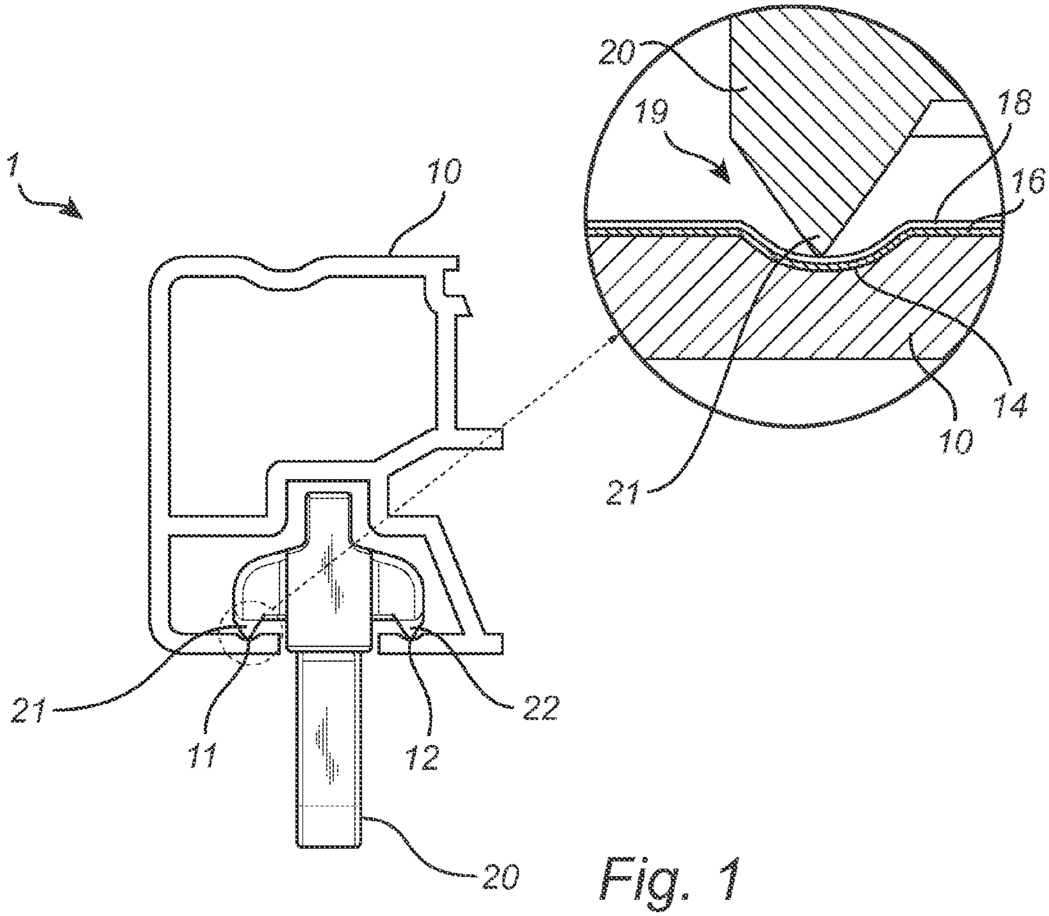
FIG. 1 depicts a cross section of a sliding door sliding system according to a first embodiment.
Figure 2:
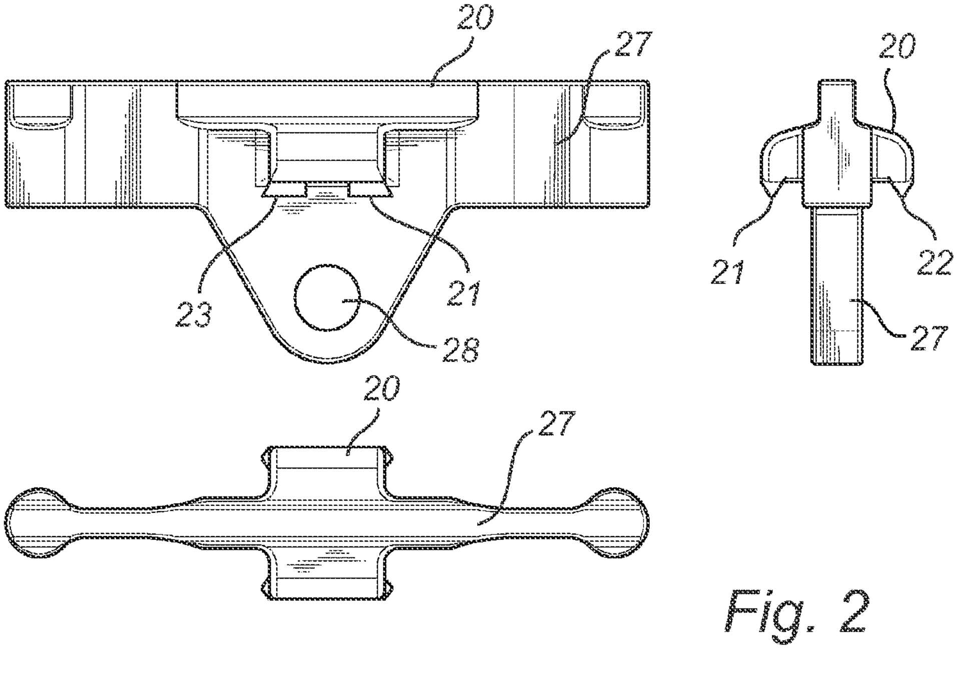
FIG. 2 depicts cross sections of the sliding member in FIG. 1.
Figure 7:
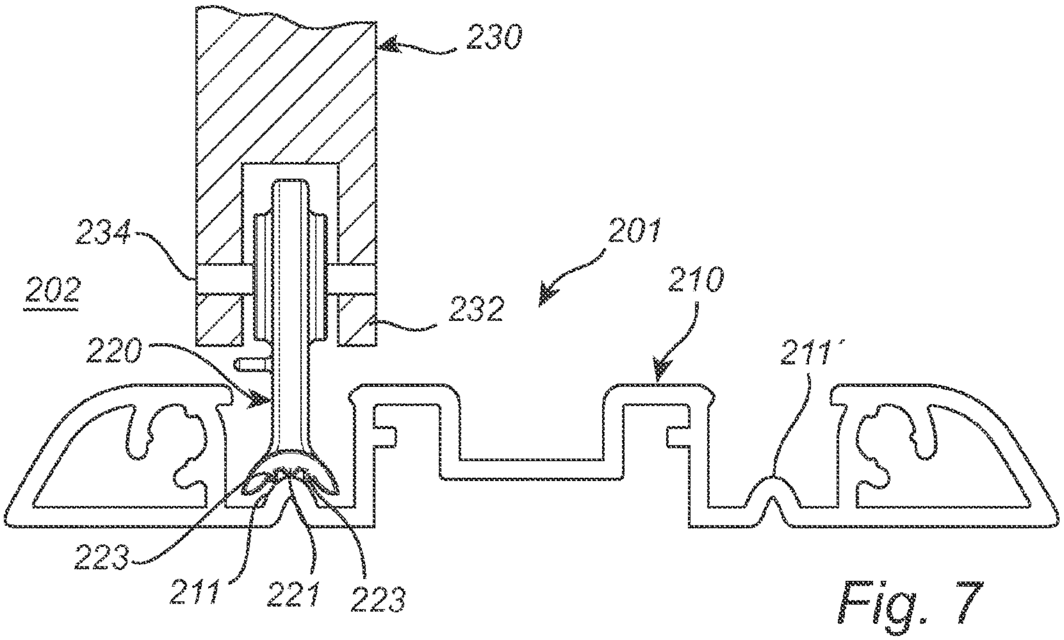
FIG. 7 depicts a cross section of a sliding door sliding system according to a third embodiment.

According to an embodiment there is provided a sliding screen sliding system comprising a linear slide bar 10; 110; 210; 310 having a slide surface 14 coated with a lacquer 16 comprising a resin and at least one sliding member 20; 120; 220; 320. As illustrated in FIGS. 1, 2 and 7, the provided sliding screen sliding system may for example be in the form of a sliding door sliding system 1; 101; 201 for a sliding door 30; 130; 230, or as illustrated in FIG. 8 in the form of a sliding curtain sliding system 301 for a sliding curtain 330. The lacquer 16 is in turn at least partly coated with a lipophilic composition coating 18 to provide a slide layer 19 with lowered friction. By coating the lacquer 16, the sliding friction is not just temporarily lowered, but long term low sliding friction is obtained. As already explained the lubricating coating may be permanent, dispensing with the need to replenish the lubricating coating. Further, very low amounts of the lipophilic composition are needed to provide lowered friction. Thus, contamination of the lubricating coating does not pose any pronounced problem, as the coating, due to the very low amount present, does not have substantial adhesive properties. This is in contrast to the normal use of lubricants in plain bearings. Further, exposure to contaminations, e.g. dust etc., has been shown not to affect the lowered friction. Neither is the lubricating coating sensitive to washing. Wiping the slide bar 10 with a dry and/or wet cloth, does not affect the lowered friction. These properties make the slide bar 10 very useful for sliding wardrobe doors and similar applications.

As used herein, the phrase "sliding screen" is intended to mean plate like objects that may slide in a horizontal direction to permit or restrict access to and/or permit or restrict viewing of a certain area. Hence, the phrase "sliding screen" include, for example, sliding doors of wardrobes, sliding doors for cupboards, sliding doors for kitchen cupboards, sliding doors for glazed-in patios or balconies, sliding windows for glazed-in patios and balconies, sliding doors, with or without glass, that separate rooms in an apartment, house or office space, sliding curtains that cover windows or doors, sliding curtains that separate rooms or parts of rooms in an apartment, house or office space, etc.

By arranging the interface between slide layer 19 of the slide bar 10; 110; 210; 310 and the sliding member 20; 120; 220; 320 in sliding contact a linear plain bearing is provided as shown in FIGS. 1, 3, 7, and 8. The interface between the slide layer of the slide bar 10; 110; 210; 310 and the sliding member 20; 120; 220; 320 thus forms a linear plain bearing to allow for linear movement of the sliding member 20; 120; 220; 320 along the longitudinal axis of the linear slide bar 10; 110; 210; 310. The sliding system 1; 101; 201; 301 is arranged to support a sliding screen 30; 130; 230; 330 connected to the sliding member 20; 120; 220; 320 to allow for linear movement of the sliding screen 30; 130; 230; 330 along the longitudinal axis of the linear slide bar 10; 110; 210; 310.

Such a low amount of the lipophilic composition coating 18 is needed, that the lipophilic composition may be applied to a sliding member 20; 120; 220; 320 rather than to the slide bar 10; 110; 210; 310. In sliding over the slide bar 10; 110; 210; 310, the lipophilic composition will be transferred to the slide bar 10; 110; 210; 310 to provide a lipophilic composition coating 18. Hence, the lipophilic composition coating 18 could be applied to the slide bar 10; 110; 210; 310, to the sliding member 20; 120; 220; 320, or both.

While the slide bar according to one preferred embodiment is an aluminum profile, preferably with an aluminum oxide layer, also other materials coated with a lacquer comprising a resin may be considered. In order to allow for long term use and to carry loads, the slide bar 10; 110; 210; 310 is typically made from a hard material, such as metal or glass. Especially, the surface of the slide bar 10; 110; 210; 310 should preferably be hard. The Vickers hardness of the material from which the slide bar 10; 110; 210; 310 is made, may be at least 50 MPa, more preferably at least 100 MPa, even more preferably at least 150 MPa, and most preferably at least 300 MPa. According to an embodiment, the slide bar 10; 110; 210; 310 is a metal bar, such as an aluminum bar or a steel bar. While it is preferred if an aluminum bar has an oxide layer, also a raw, i.e. not oxidized, lacquered aluminum bar may be used. It is however preferred if the surface of the aluminum bar is oxidized to provide the aluminum bar with a hard oxide surface layer.

The slide bar 10; 110; 210; 310 may be an aluminum bar. Further, the surface of the aluminum bar coated with the lacquer 16 may be an aluminum oxide layer. The thickness of such oxide layer may be at least 5 micrometers, more preferably at least 10 micrometers. Further, the thickness of the oxide layer may be less than 250 micrometers, such as less than 100 micrometers or less than 50 micrometers. As known in the art, the durability and hardness of the surface of aluminum profiles may be improved by oxidation due to the properties of aluminum oxide. The oxide layer initially provided by anodically oxidation is porous. While the pores may be closed by steam treatment, sealing via anaphoretically coating with an acrylic resin subsequently heat cured to form the lacquer, is even more effective in sealing the porous aluminum oxide layer: This method, firstly disclosed by Honny Chemicals Co. Ltd. (cf. GB 1,126,855), is often referred to as the Honny process.

Further, compared to plastic slide bars, a hard, stiff bar, such as aluminum or steel bar, may accept far more heavy loads and still provide low friction.

In addition, it has been found that a relatively high contact pressure in the contact between the slide bar 10; 110; 210; 310 and the sliding member 20; 120; 220; 320 reduces the friction. For this reason as well it is beneficial to make the slide bar 10; 110; 210; 310 from a hard material, such as aluminum or steel, since such materials can accept higher contact pressures, thereby reducing friction.

According to an embodiment, the low friction slide bar 10; 110; 210; 310 is a linear aluminum profile. Preferably, the linear aluminum profile is oxidized (e.g. anodized) in order to increase the hardness of the surface. The profile is typically anaphoretically coated with an acrylic resin subsequently heat cured, thereby providing a linear slide bar 10; 110; 210; 310 having lacquered slide surface 14. The aluminum profile may be anodized to obtain an anodized layer thickness of at least 5 micrometers, more preferably at least 10 micrometers, prior to application of the resin of the lacquer. Further, thickness of the anodized layer may be less than 250 micrometers, such as less than 100 micrometers or less than 50 micrometers. Such profiles may be obtained via the Honny process (cf. above) or one of its derivatives. Typically, the Honny process is used to provide white, glossy profiles. However, neither the Honny process nor the present embodiments are limited to white profiles. The preferable feature is that the lacquer 16 is suitable for being coated with the lipophilic composition coating 18.

As known in the art, various resins, e.g. thermosetting resins, may be used to lacquer aluminum bars and other bars, i.e. to form a lacquer on aluminum bars and other bars, e.g. steel bars. The lacquer 16 comprises a resin. As known to the skilled person, a lacquer is a hard, thin coating. The resin of the lacquer 16 may for this application preferably comprise polar groups, such as hydroxyl groups, carboxylic acid groups, amide groups, cyano groups (nitrile groups), halide groups, sulfide groups, carbamate group, aldehyde groups, and/or ketone groups. Further may the resin of the lacquer 16 be a thermosetting resin.

Examples of resins for lacquering metal comprise acrylic resins and polyurethane resins. According to an embodiment, the resin is an acrylic resin, such as an acrylate resin, an acrylamide resin, a methacrylate resin, or a methyl metachrylate resin, and mixtures thereof. According to another embodiment, the resin is a polyurethane resin. The acrylic resin may be a thermosetting resin.

According to another embodiment, the resin of the lacquer 16 is selected from the group consisting of: acrylic resins, acrylate resins, acrylamide resins, methacrylate resins, methyl metachrylate resins, acrylonitrile resins, styrene-acrylonitrile resins, acrylonitrile styrene acrylate resins, reaction products or a mechanical mixture of alkyd resin and water-soluble melamine resin, reaction products or a mechanical mixture of a vinyl-modified unsaturated alkyd resin and a water-soluble melamine resin, and polymers and mixtures of one or several of these resins.

Further, the thermosetting resin may include the reaction product or a mechanical mixture of an alkyd resin and water-soluble melamine resin, or of a vinyl-modified unsaturated alkyd resin and a water-soluble melamine resin, the water-soluble melamine resin being obtained from hexamethylol melamine hexaalkylether. Vinyl modified unsaturated alkyd resins may be made by polymerization of a vinyl monomer with an alkyd resin composed of an unsaturated oil or fatty acid. As known to the skilled person, the term “vinyl monomer” relates to a monomer having a vinyl group ($—CH{=}CH_2$) in the molecule, such as an acrylic ester, for example methyl acrylate and ethyl acrylate, a methacrylic ester, for example methyl methacrylate and hydroxyethyl methacrylate, an unsaturated, organic acid, for example acrylic acid and methacrylic acid, and styrene.

Processes for obtaining thermosetting acrylic resins are well-known to the skilled person. As an example, they may be obtained by heating and stirring a mixture consisting of organic solvents, such as methanol, ethylene glycol, monobutyl ether, and/or cyclohexanone, unsaturated organic acids, such as acrylic acid, methacrylic acid, and/or maleic anhydride, a cross-linking vinyl monomer (as defined above), such as methylol-acrylamide and/or methylol methacrylamide, a polymerizable vinyl monomer, such as styrene and/or acrylic acid ester, polymerization catalysts, such as benzoyl peroxides and/or lauroyl peroxides, and polymerization regulators, such as dodecyl mercaptan and/or carbon tetrachloride, to carry out polymerization, thereafter neutralizing the product with, for example, an aqueous solution of ammonia and/or triethylamine to make the resin soluble in water. Further, as known to the skilled person, thermosetting resins composed of alkyd resins and water-soluble melamine resin may be obtained from hexamethylol melamine hexaalkyl ether, may be obtained by mixing a water-soluble melamine resin at a temperature of from room temperature to 100° C. with an alkyd resin modified with a fatty acid, the alkyd resin having an acid value of from 10 to 80 and being obtained by heating a mixture consisting of (1) a saturated or unsaturated aliphatic acid, (2) ethylene glycol, glycerol, polyethylene glycol, other polyhydric alcohol or an epoxide, (3) adipic acid, sebacic acid, maleic anhydride or other polybasic acid or anhydride, and (4) a small quantity of cyclohexanone, toluene or other organic solvent. Thermosetting resins may also be obtained by mixing a water-soluble melamine resin and an alkyd resin from the ester exchange process, the resin being obtained by esterifying a mixture of dehydrated castor oil, an above-mentioned polyhydric alcohol and a small amount of an ester exchanging catalyst such as caustic potash, and thereafter esterifying also an above-mentioned polybasic acid or anhydride. As further known to the skilled person, thermosetting resins consisting of a modified acrylic resin and a water-soluble melamine resin, obtained from hexamethylol melamine hexaalkyl ether, may be obtained by polymerising by heating and stirring a mixture consisting of organic solvents, such as methanol, ethylene glycol, monobutyl ether and/or cyclohexanone, unsaturated acids, such as acrylic acid and/or methacrylic acid, a vinyl monomer (as hereinabove defined), such as styrene and/or acrylic acid ester, a cross-linking vinyl monomer, if necessary, such as methylol, is normally used. Good results may be obtained by using a concentration of resin of from 5 to 20% by weight and by regulating the voltage and the initial current density within a safe and economical range.

As known to the skilled person further resins for use in lacquering metal surfaces are known in the art. As an example, the resin of the lacquer may be selected from the group consisting of cationic epoxy electrocoat, epoxy and polyester resins, and polyester resins. Still further, lacquers adapted for autodeposition coating, such as Autophoretic™ coatings (e.g. Aquence™ Autophoretic® 866™ and BONDERITE® M-PP 930™, the latter being an epoxy-acrylic urethane) available from Henkel AG, DE, may also be used, especially in lacquering surfaces comprising iron.

The slide surface 14 may be lacquered by electrocoating involving dipping the slide member 10; 110; 210; 310 into a bath containing the lacquer and applying an electric field to deposit lacquer onto the slide member 10; 110; 210; 310 acting as one of the electrodes. Further, the lacquer may be provided in powder form or in liquid form. Both powder and liquid lacquers may be sprayed onto the slide surface 14 to coat it. For powder lacquers, electro static coating may be used. For liquid lacquers a wet spray application or application in a bath may be used. Further, liquid lacquers in a bath may apart from electrocoating be applied by autodeposition.

In order to provide low friction, the thickness of the lacquer should be as even as possible. Thus it may be preferred to apply the lacquer by an electrocoating process, e.g. anaphoretic coating (cf. the Honny method) or cataphoretic coating, providing very even coatings. There are two types of electrocoating, i.e. anodic and cathodic electrocoating. Whereas the anodic process was the first to be developed commercially, the cathodic process is nowadays more widely used. In the anodic process, a negatively charged material is deposited on the positively charged component constituting the anode. In the cathodic process, positively charged material is deposited on the negatively charged component constituting the cathode. In the art, cathodic electrocoating is also known as cathodic dip painting (CDP), cathodic dip coating, cataphoretic coating, cataphoresis and cathodic electrodeposition. Further, the electrocoating process may also be referred to by the trade names of the bath material used. Examples include Cathoguard (BASF), CorMax (Du Pont), Powercron (PPG) and Freiotherm (PPG). Further, also electrostatically coating by powder lacquers or autodeposition coating in a bath provide even coatings and may thus be used.

In lacquering steel surfaces, autodeposition may be used. As recognized by the skilled person, one of the important steps in autodeposition is the coating bath itself, where water-based paint emulsion at low solids (usually around 4-8% by weight) is combined with two other products. A "starter" solution of acidified ferric ($Fe^{3+}$) fluoride initiates the coating reaction and an oxidizing product stabilizes the metal ions in the solution. The coating emulsion is stable in the presence of ferric ions, but unstable in the presence of ferrous ions ($Fe^{2+}$). Therefore, if ferrous ions are liberated from the metal substrate, localized paint deposition will occur on the surface. Immersion of a component made from ferrous metal (e.g. steel) into an autodeposition bath causes the acidic environment to liberate ferrous ions, thereby causing the coating emulsion to be deposited, forming a mono-layer of paint particles. Henkel Adhesive Technologies (US)//Henkel AG & Co. KGaA (Germany) provides coatings under the trademark BONDERITE® for use in autodeposition.

As the lacquer 16 coated on the slide bar 10; 110; 210; 310 typically is more compressible than the material of the slide bar 10; 110; 210; 310 itself, and as load carrying sliding member will apply pressure on the lacquer 16 in sliding over the slide bar 10; 110; 210; 310, the thickness of the lacquer 16 preferably is to be kept thin to reduce compression of it. Compressing the lacquer 16 may negatively affect the sliding resistance; especially at the start of the sliding sequence, i.e. when the sliding member starts to move along the slide bar 10; 110; 210; 310 from a previous state of being at rest. According to an embodiment, the thickness of the lacquer 16 coated on the slide bar 10; 110; 210; 310 is thus 100 μm or less, preferably 75 μm or less, more preferably 50 μm or less. Further, the thickness of lacquer 16 coated on the slide bar 10; 110; 210; 310 may be 5 to 75 μm, such as 10 to 50 μm, or 15 to 40 μm. Layers of these thicknesses have been found to provide for efficient sliding behavior, also at the instance when the sliding member starts to move along the slide bar 10; 110; 210; 310.

Not only the low dynamic friction provided by the present linear slide bar, but also the low difference between the static and dynamic friction provided by the present linear slide bar is beneficial in terms of the sliding behavior.

In order to reduce the friction of the slide bar 10; 110; 210; 310, the slide bar 10; 110; 210; 310 is, at least partly, coated with a lipophilic composition coating 18 to provide a slide layer 19. Further, while various components may be present in the lipophilic composition coating 18 present on the lacquer 16, the composition typically comprises components with long carbon chains, e.g. carbon chains having a carbon atom length of C6 or more, such as C8 or more, or C12 or more. Thus, the lipophilic composition coating 18 may comprise compounds comprising C6 to C40, such as C8 to C30 or even C10 to C24, non-aromatic hydrocarbyl groups. Typical examples of such non-aromatic hydrocarbyl groups are alkenyl groups and alkyl groups, e.g. alkyl groups. Examples of compounds comprising such non-aromatic hydrocarbyl groups are:

- C6 to C40 non-aromatic hydrocarbons, such as alkenes and/or alkanes, e.g. alkanes;
- tri-glycerides, e.g. triglycerides comprising C6 to C40, such as C8 to C30, non-aromatic hydrocarbyl groups; and
- fatty acids, e.g. C6 to C40, such as C8 to C30, carboxylic acids, and esters thereof, such as alkyl esters of fatty acids, e.g. methyl esters.

As known to the skilled person and as recognized in IUPAC's gold book (International Union of Pure and Applied Chemistry, Compendium of Chemical Terminology—Gold Book, Version 2.3.3 of 2014 Feb. 24):

- hydrocarbon denotes compounds consisting of carbon and hydrogen only;
- hydrocarbyl denotes univalent groups formed by removing a hydrogen atom from a hydrocarbon;
- alkane denotes acyclic branched or unbranched hydrocarbons having the general formula $C_nH_{2n+2}$;
- alkene denotes acyclic branched or unbranched hydrocarbons having one or more carbon-carbon double bond(s);
- alkyl denotes a univalent group derived from alkanes by removal of a hydrogen atom from any carbon atom $—C_nH_{2n+1}$;
- alkenyl denotes an univalent group derived from alkenes by removal of a hydrogen atom from any carbon atom;
- fatty acid denotes an aliphatic monocarboxylic acid;
- triglyceride denotes an ester of glycerol (propane-1,2,3-triol) with three fatty acids (tri-O-acylglycerol); and
- non-aromatic denotes a compound not comprising any cyclically conjugated molecular entity with increased stability due to delocalization.

According to an embodiment, the lipophilic composition coating 18 present on the lacquer 16 comprises at least 1 wt. % such as at least 5 wt. %, 10 wt. %, 25 wt. %, 50 wt. %, 60 wt. %, 70 wt. %, 75 wt. %, 80 wt. %, 85 wt. % or 90 wt.

% of compounds comprising C6 to C40, such as C8 to C30, alkyl groups. Thus, the lipophilic composition coating 18 may comprise least 1 wt. % such as at least 5 wt. %, 10 wt. %, 25 wt. %, 50 wt. %, 60 wt. %, 70 wt. %, 75 wt. %, 80 wt. %, 85 wt. % or at least 90 wt. % C6 to C40, such as C8 to C30, alkenes and/or alkanes, e.g. alkanes. Further, the lipophilic composition coating 18 present on the lacquer 16 may comprise least 1 wt. % such as at least 5 wt. %, 10 wt. %, 25 wt. %, 50 wt. %, 60 wt. %, 70 wt. %, 75 wt. %, 80 wt. %, 85 wt. % or at least 90 wt. % triglycerides and/or fatty acids (or alkyl esters thereof).

Whereas fatty acids have been found to improve the lubricating effect of mixtures of alkanes, such as liquid paraffin, they are less effective if used on their own. It is thus preferred if the lipophilic composition coating 18 present on the lacquer 16 is not only composed of fatty acids. The lipophilic composition present on the lacquer 16 may thus comprise less than 99 wt. % fatty acids, such as less than 95 wt. % fatty acids. However, lipophilic compositions essentially only comprising triglycerides, such as coco nut oil, provide very low friction and do thus represent a preferred lipophilic composition present on the lacquer 16.

According to an embodiment, the lipophilic composition coating 18 present on the lacquer 16 comprises at least 1 wt. % such as at least 5 wt. %, 10 wt. %, 25 wt. %, 50 wt. %, 60 wt. %, 70 wt. %, 75 wt. %, 80 wt. %, 85 wt. % or at least 90 wt .% of alkenes and/or alkanes, e.g. alkanes and 0.1 to 50 wt. %, such as 1 to 40 wt. % or 5 to 30 wt. % triglycerides and/or fatty acids.

According to another embodiment, the lipophilic composition coating 18 present on the lacquer 16 comprises at least 1 wt. % such as at least 5 wt. %, 10 wt. %, 25 wt. %, 50 wt. %, 60 wt. %, 75 wt. %, 80 wt. % or 90 wt. % in total of triglycerides and/or fatty acids and 0.1 to 95 wt. %, such as 1 to 90 wt. % or 5 to 60 wt. % alkenes and/or alkanes, e.g. alkanes.

As already mentioned, typical examples of compounds comprising C6 to C40 non-aromatic hydrocarbyl groups are tri-glycerides and fatty acids. According to an embodiment, the lipophilic composition coating 18 present on the lacquer 16 comprises triglycerides and/or fatty acids. The lipophilic composition coating 18 may thus comprises more than 25 wt. %, e.g. more than 50 wt. %, such as 50 to 100 wt. %, or 75 to 95 wt. %, in total of triglycerides and fatty acids. The triglycerides and/or fatty acids may either be used as the major component in the lipophilic composition coating 18 or as additives.

If to be used as a major component, the lipophilic composition present on the lacquer 16 coating may comprise more than 50 wt. %, such as 50 to 100 wt. %, or 75 to 95 wt. %, triglycerides, e.g. triglycerides to at least 90 wt. % composed of a glycerol residue and 3 residues of caproic acid, caprylic acid, capric acid, lauric acid, myristic acid, palmitic acid, stearic acid, and/or arachidic acid, such as 3 residues of lauric acid, myristic acid, palmitic acid, and/or stearic acid. According to an embodiment, the lipophilic composition coating 18 present on the lacquer 16 comprises coconut oil, such as at least 25 wt. % such as at least 50 wt. %, 60 wt. %, 70 wt. %, 75 wt. %, 80 wt. %, 85 wt. %, or at least 90 wt. % coconut oil. Coconut oil comprises triglycerides composed of fatty acids that are to a high degree saturated fatty acids. The coconut oil may be hydrogenated to various degrees to further reduce the amount of unsaturated fatty acids residues. Further, the lipophilic composition coating 18 present on the lacquer 16 may comprise more than 50 wt. %, such as 50 to 100 wt. %, or 75 to 95 wt. % fatty acids, e.g. caproic acid, caprylic acid, capric acid, lauric acid, myristic acid, palmitic acid, stearic acid, and/or arachidic acid, such as lauric acid, myristic acid, palmitic acid, and/or stearic acid. Furthermore, the lipophilic composition coating 18 present on the lacquer 16 may comprise more than 50 wt. %, such as 50 to 100 wt. %, or 75 to 95 wt. % alkyl esters of fatty acids, e.g. methyl or ethyl esters. The esterified fatty acids may be caproic acid, caprylic acid, capric acid, lauric acid, myristic acid, palmitic acid, stearic acid, and/or arachidic acid, such as lauric acid, myristic acid, palmitic acid, and/or stearic acid.

If to be used as a minor additive, the lipophilic composition coating 18 present on the lacquer 16 may comprise 0.1 to 50 wt. %, such as 1 to 30 wt. % or 5 to 15 wt. %, triglycerides, e.g. triglycerides to at least 90% composed of a glycerol residue and 3 residues of caproic acid, caprylic acid, capric acid, lauric acid, myristic acid, palmitic acid, stearic acid, and/or arachidic acid, such as 3 residues of to at least 90% myristic acid, palmitic acid, and/or stearic acid. A preferred example of composition to be used to provide a lipophilic composition coating 18 comprising triglycerides is coconut oil. According to an embodiment, the lipophilic composition coating 18 present on the lacquer 16 comprises coconut oil, such as 0.1 to 50 wt. %, such as 1 to 30 wt. % or 5 to 15 wt. %, coconut oil. According to an embodiment, the lipophilic composition coating 18 present on the lacquer comprises at least 50 wt. % coconut oil, such as at least 60 wt. %, 70 wt. %, 75 wt. %, 80 wt. %, 85 wt. %, or at least 90 wt. % coconut oil. Coconut oil comprises triglycerides composed of fatty acids that are to a high degree saturated fatty acids. The coconut oil may be hydrogenated to various degrees to further reduce the amount of unsaturated fatty acids residues. Further, the lipophilic composition present on the lacquer 16 may comprise 0.1 to 50 wt. %, such as 1 to 30 wt. % or 5 to 15 wt. %, of fatty acids, e.g. caproic acid, caprylic acid, capric acid, lauric acid, myristic acid, palmitic acid, stearic acid, and/or arachidic acid, such as to at least 90% myristic acid, palmitic acid, and/or stearic acid. Furthermore, the lipophilic composition coating 18 present on the lacquer 16 may comprise 0.1 to 50 wt. %, such as 1 to 30 wt. % or 5 to 15 wt. %, of alkyl esters of fatty acids, e.g. methyl or ethyl esters. The esterified fatty acids may be caproic acid, caprylic acid, capric acid, lauric acid, myristic acid, palmitic acid, stearic acid, and/or arachidic acid, such as to at least 90% myristic acid, palmitic acid, and/or stearic acid.

Both saturated and un-saturated compounds comprising C6 to C40 non-aromatic hydrocarbyl groups are well-known in the art. While both types of compounds will be efficient in reducing the sliding resistance, saturated compounds comprising C6 to C40 non-aromatic hydrocarbyl groups are deemed to be less sensitive to oxidative degradation. Thus, it may be preferred to use compounds comprising C6 to C40 non-aromatic hydrocarbyl groups being triglycerides composed of saturated fatty acids residues and/or saturated fatty acids in the composition. It may however not be necessary to use a 100% saturated fatty acids and/or triglycerides. As example, coconut oil is envisaged to have sufficient long term stability, though saturated fatty acids and/or triglycerides are preferred in terms of their long term stability.

As mentioned, the lipophilic composition coating 18 present on the lacquer 16 may comprises at least 1 wt. % C6 to C40 alkanes. As an example, the lipophilic composition coating 18 present on the lacquer 16 may thus comprise mineral oil, such as at least 1 wt. %, such as at least 5 wt. %, 10 wt. %, 25 wt. %, 50 wt. %, 60 wt. %, 70 wt. %, 75 wt. %, 80 wt. %, 85 wt. % or at least 90 wt. % mineral oil. Mineral oil is a colorless, odorless, light mixture of higher alkanes from a non-vegetable (mineral) source. Further, the lipophilic composition present on the lacquer 16 coating may comprise liquid paraffin, such as at least 1 wt. %, such as at least 5 wt. %, 10 wt. %, 25 wt. %, 50 wt. %, 60 wt. %, 70 wt. %, 75 wt. %, 80 wt. %, 85 wt. % or at least 90 wt. % liquid paraffin. Liquid paraffin, also known as paraffinum liquidum, is a very highly refined mineral oil used in cosmetics and for medical purposes. A preferred form is the one having CAS number 8012-95-1. Furthermore, the lipophilic composition coating 18 present on the lacquer 16 may comprise petroleum jelly (also known as petrolatum, white petrolatum, soft paraffin or multi-hydrocarbon), such as at least 1 wt. %, such as at least 5 wt. %, 10 wt. %, 25 wt. %, 50 wt. %, 60 wt. %, 70 wt. %, 75 wt. %, 80 wt. %, 85 wt. % or at least 90 wt. % petroleum jelly. Petroleum jelly is a semi-solid mixture of hydrocarbons (with carbon numbers mainly higher than 25). A preferred form is the one having CAS number 8009-03-8.

According to an embodiment the sliding system 101; 201, 301 comprises at least two sliding members 120, 120'; 220, 320. The interface between the slide layer of the slide bar 110; 210; 310 and each of the sliding members 120, 120'; 220; 320 forms a linear plain bearing to allow for linear movement of the sliding members 120, 120'; 220; 320 along the longitudinal axis of the linear slide bar 110; 210; 310. The sliding members 120, 120'; 220; 320 may be arranged to support a sliding screen 130; 230, 330 connected to the sliding members 120, 120'; 220; 320 to allow for linear movement of the sliding screen 130; 230; 330 along the longitudinal axis of the linear slide bar 110; 210; 310.

The slide layer 19 may be arranged at a track, e.g. a groove 11, 12; 111, 112, or a hill 211, extending along the longitudinal axis of the slide bar 10; 110; 210 to define a slide direction. Presence of a track improves the control of the lateral position of the sliding member 20; 120; 220 in relation to the slide bar when the sliding member slides along the slide bar 10; 110; 210.

Figure 3:
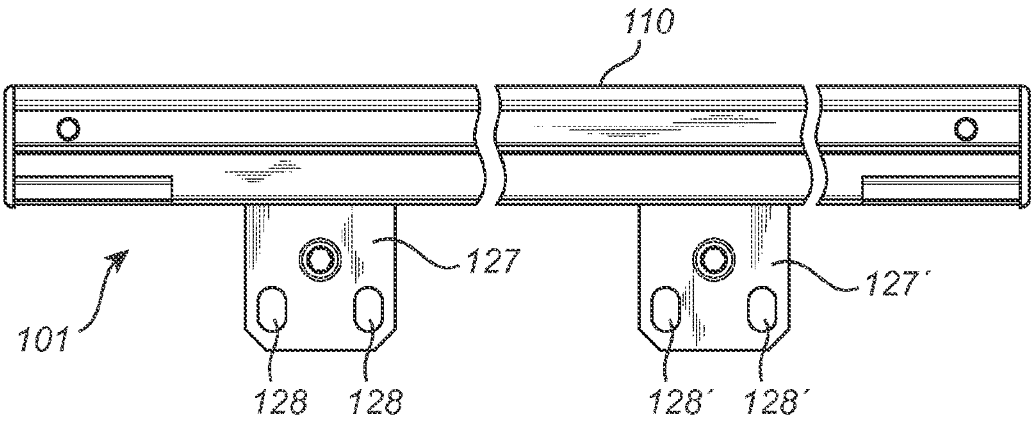
FIG. 3 depicts a sliding door sliding system according to a second embodiment as seen both in side view and in a cross section thereof.
Figure 3:
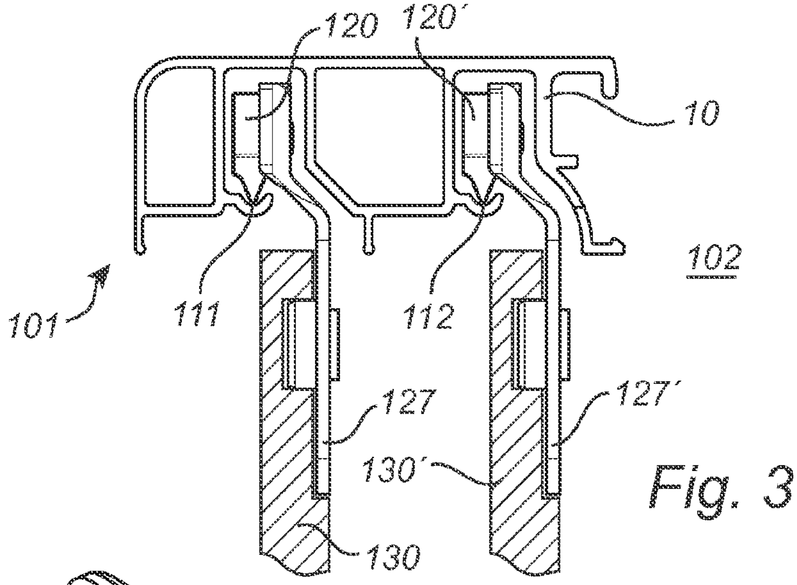

According to an embodiment, the slide bar 10; 110 is provided with a groove 11; 111, as illustrated in FIGS. 1 and 3, extending along the longitudinal axis of the slide bar 10; 110 and defining a slide direction along the longitudinal axis of the slide bar 10; 110. When the slide bar 10; 110 is provided with a groove 11; 111, the slide layer 19 is present in the groove 11; 111.

According to an embodiment, the slide bar 210 is provided with a hill 211, as illustrated in FIG. 7, extending along the longitudinal axis of the slide bar 210 and defining a slide direction along the longitudinal axis of the slide bar 210. When the slide bar 210 is provided with a hill 211, the slide layer is present on the hill 211.

Figure 4:
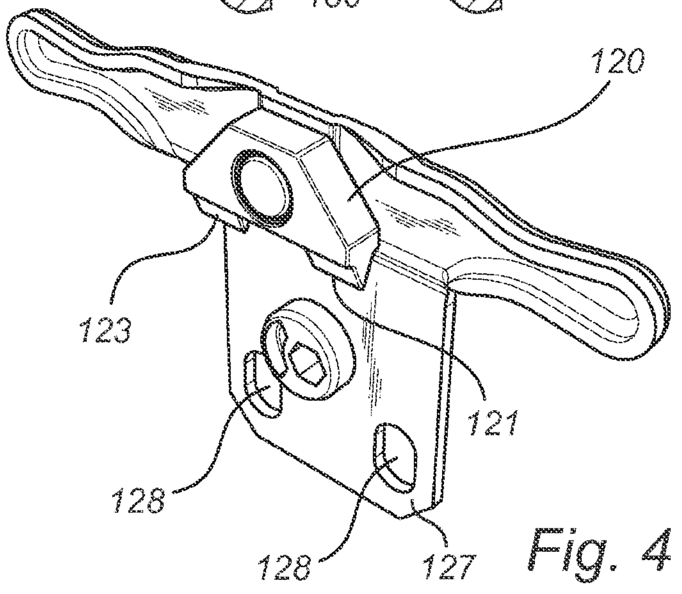
FIG. 4 depicts a sliding member of the embodiment in FIG. 3.

Further, the part of the sliding member 20; 120; 220; 320 arranged in contact with the slide layer 19 may be configured as a blade 21; 121; 221; 321 extending in the sliding direction, as illustrated in FIG. 2, FIG. 4, and FIG. 8.

Tt was surprisingly found that decreasing the contact area at the interface between the slide bar 10; 110; 210; 310 and the sliding member 20; 120; 220; 320 reduced the friction, such as by configuring the part of the sliding member 20; 120; 220; 320 arranged in contact with the slide layer 19 as a blade 21; 121; 221; 321. Normally the risk for the bearing seizing typically increases with reduced contact area. In order to provide the sliding system 1; 101; 201; 301, the sliding member 20; 120; 220; 320 comprises at least one contact point in contact with the slide bar 10; 110; 210; 310 at the interface between the slide bar 10; 110; 210; 310 and the sliding member 20; 120; 220; 320. According to an embodiment, the contact area of each individual contact point is less than 3 $mm^2$, such as less than 1.5 $mm^2$, or less than 0.75 $mm^2$. The slide member may further be provided with more than one contact point, such as 2, 3, or 4 contact points. If the sliding member is configured as having one or more blade(s) 21, 22, 23; 121, 123; 221; 321, 322, 323 extending in the sliding direction, then the edge of the blade represents an individual contact point.

It has been found that the friction becomes lower when the contact pressure between the sliding member and the slide bar is relatively high. The contact pressure is calculated by dividing the load carried by each individual contact point by the contact area of the contact point. For example, if the sliding door has a total weight of 8.5 kg this represents a total load of 83.3 N. The sliding door may be carried by two sliding members 20. Each sliding member 20 of the design illustrated in FIG. 2 has four contact points, i.e. edges of the blades 21, 22, 23 in FIG. 2 (fourth blade not shown), each such contact point having an area of 0.675 $mm^2$. The contact pressure is then: 83.3 N/(2×4×0.675 $mm^2$)=15.4 N/$mm^2$. Preferably, the contact pressure in said at least one contact point is at least 4 N/$mm^2$, more preferably at least 8 N/$mm^2$, such as at least 12 N/$mm^2$. Preferably, the contact pressure is lower than the strain at yield (=yield strength) for the material from which the sliding member 20 is made.

In order to provide low friction, at least the part of the sliding member 20; 120; 220; 320 in contact with the slide layer is preferably made of a plastic comprising a polymer, such as a polymer comprising polar groups. Examples of such polar groups include hydroxyl groups, carboxylic acid groups, amide groups, halide groups, sulfide groups, cyano groups (nitrile groups), carbamate groups, aldehyde groups, and/or ketone groups The polymer may be selected from the group consisting of polyoxymethylenes (POM), polyesters (e.g. thermoplastic polyesters, such as polyethylene terephthalate (PET), polytrimethylene terephthalate (PTT), polybutylene terephthalate (PBT), and polylactic acid (PLA), as well as bio-based thermoplastic polyesters, such as polyhydroxyalkanoates (PHA), polyhydroxybutyrate (PHB), and polyethylene furanoate (PEF)), polyamides (PA), polyvinyl chloride (PVC), polyphenylene sulfide (PPS), polyaryletherketone (PAEK; e.g. Polyether ether ketone (PEEK)), and Polytetrafluoroethylene (PTFE). Further, not only the part of the sliding member 20; 120; 220; 320 in contact with the slide layer may be made of a polymer, but the entire sliding member 20; 120; 220; 320 may be made of a polymer. Thus, the sliding member may be made, in its entirety, from a plastic comprising a polymer. As recognized by the skilled person, the plastic may further comprise other additives, such as fillers, colorants, and/or plasticizers. Further, the sliding member 20; 120; 220; 320 may be made from a composite comprising a polymer, such as one of the above listed polymers, tilled with particles and/or fibers. The particles and/or fibers will increase the hardness, the stiffness, the creep resistance and elongation (compression) at yield of the sliding member 20. While not affecting the friction, presence of particles and/or fibers may affect the wear. Thus, use of particles and/or fibers in the plastic is less preferred.

According to an embodiment the linear slide bar 10; 110; 210 has two parallel slide layers, as illustrated in FIGS. 1, 3 and 7. The slide layers may be arranged at a first and second track, respectively, to improve the control of the lateral position of the sliding member 20; 120; 220 in relation to the slide bar 10; 110; 210 when the sliding member 20; 120; 220 slides along the slide bar 10; 110; 210. The first slide layer, which may be present in a first groove 11; 111, extends along the longitudinal axis of the slide bar 10; 110. The second slide layer, which may be present in a second groove 12; 112 being parallel to the first groove 11; 111; 211, extends along the longitudinal axis of the slide bar 10; 110. The first 11; 111 and second 12; 112 grooves form slide layers that arc distinct and parallelly displaced in relation to each other.

In order to prevent rotation along the sliding axis, the sliding member 20; 320 is according to an embodiment, as shown in FIGS. 1, 2, and 8, provided with two parallel, displaced blades 21, 22; 321, 322 arranged along different longitudinal axes. Further, as already mentioned and illustrated in FIG. 1, the slide bar 10 may be provided with two parallel grooves 11, 12 arranged along each side of its longitudinal sliding axis to support and guide such two parallel blades 21, 22 of the sliding member.

According to an embodiment, wherein the linear slide bar 110 has two slide layers extending along the longitudinal axis of the slide bar 110, the sliding system 101 may be arranged to support two sliding doors 130, 130' (cf. FIG. 3), for example in a two-door wardrobe. The slide layers may be provided in two grooves 111, 112. According to an embodiment wherein the sliding system 101 is arranged to support two sliding doors 130, 130', the sliding system 101 comprises at least two sliding members 120, 120'. The interface between the first slide layer and the first sliding member 120 forms a first linear plain bearing to allow for linear movement of the sliding member 120 along the longitudinal axis of the linear slide bar 110. The interface between the second slide layer and the second sliding member 120' forms a second linear plain bearing to allow for linear movement of the second sliding member 120' along the longitudinal axis of the linear slide bar 110. The first sliding door 130 is to be connected to the first sliding member 120, whereas the second sliding door 130' is to be connected to the second sliding member 120'. By connecting the sliding doors 130, 130' to such a sliding system 101, the two sliding doors 130, 130' may slide along parallel, different longitudinal axes of the linear slide bar 110 in an overlapping manner. Thus, the two doors 130, 130' may pass each other by in sliding along the different, parallel axes of the linear slide bar 110.

According to an embodiment, the sliding member 20; 120; 320 is provided with two parallel blades 21, 23; 121, 123; 321, 323 arranged along the same longitudinal axis (cf. FIGS. 2, 4, and 8). By providing the sliding member 20; 120; 320 with two parallel blades 21, 23; 121, 123; 321, 323 arranged at the same longitudinal axis, the sliding member 20; 120; 320 becomes more stable and harder to rotate out of position.

In case the sliding system 1; 101; 201; 301 is to be used to support a sliding screen, e.g. a sliding door 30; 130; 230, or a sliding curtain 330, connected to the sliding member 20; 120; 220; 320, the sliding member 20; 120; 220; 320 may be provided with fastening arrangement(s) 28; 128; 328, e.g. holes, pins, etc., for connecting the sliding member 20; 120; 220; 320 to the sliding screen 30; 130; 230; 330.

As illustrated in FIG. 4 the sliding member 120 may be mounted to a support part 127. The support part 127 is provided with a fastening arrangement 128, for example two holes, making it possible to mount the door 130 to the support part 127. In a similar manner the sliding member 120' is connected to a support part 127' having a similar fastening arrangement 128' for fastening the door 130', as indicated in FIG. 3.

Further, the sliding system 1; 301 may be provided with more than one sliding member 20, 20'; 320 to be connected to a sliding door 30 (cf. FIG. 5) or a sliding curtain 330 (cf. FIG. 8). Commonly, the sliding system 1 is provided with at least two sliding members 20, 20' for each sliding door 30 to be connected to the sliding system 1. Thus, a sliding system 101 arranged to be connected to two sliding doors, as illustrated in FIG. 3, may comprise at least four (4) sliding members 120, 120', two for each sliding door 130, 130'. A sliding system 301 for a sliding curtain typically comprises a number of sliding members 320 for each curtain.

Figure 5:
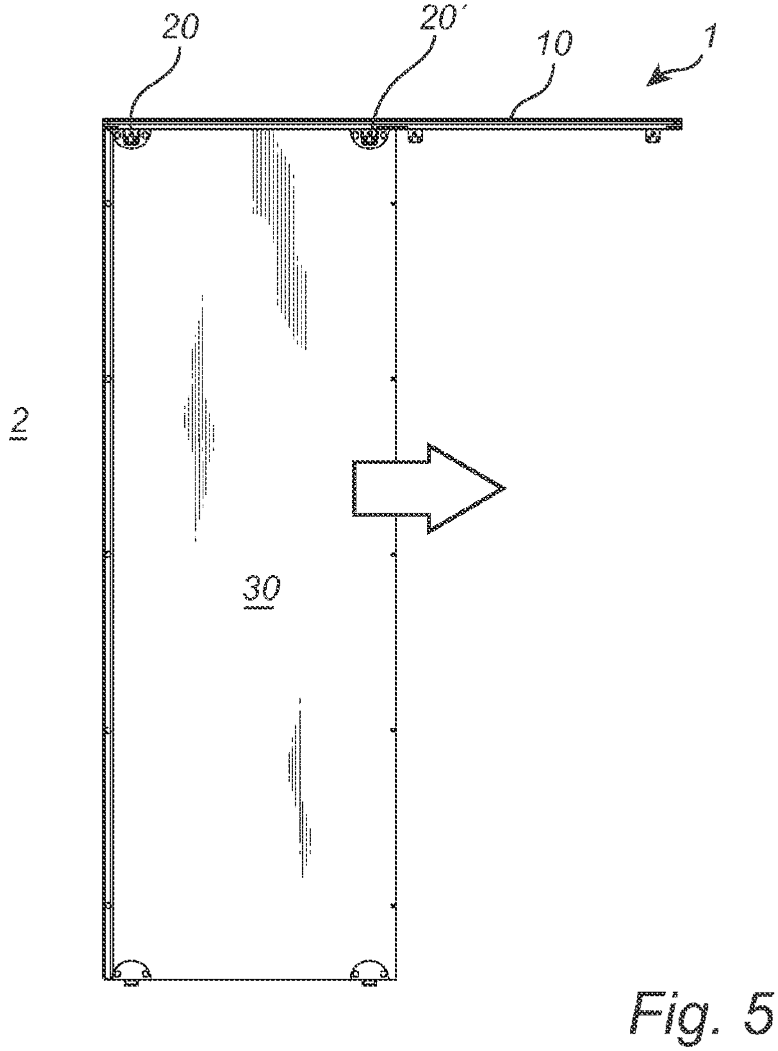
FIG. 5 depicts a schematic sliding door arrangement.

A further embodiment of the invention relates to a sliding door arrangement 2, such as a sliding door arrangement for a wardrobe. A schematic sliding door arrangement 2 is illustrated in FIG. 5. Such a sliding door arrangement 2 comprises the herein disclosed sliding system 1 and at least one sliding door 30. One, or often two or three, sliding member/-s 20 is/are arranged to support the sliding door 30 to allow for linear movement of the sliding door 30 along the longitudinal axis of the linear slide bar 10. Typically the sliding door 30 is connected to the sliding member 20 supporting the door. The slide bar 10 may be horizontally arranged in use with the slide layer facing upwards to support the sliding member 20. As the sliding member 20 may be arranged to horizontally slide over the slide bar 10, the sliding door 30 may be moved in the horizontal direction along the horizontal axis of the linear slide bar 1. The sliding door, such as a sliding door 30 for a wardrobe, may be arranged hanging from the linear slide bar 10.

According to an embodiment, the sliding door 30; 130 is to be arranged hanging from the linear slide bar 10; 110. Embodiments according to which the sliding door 30; 130 is to be arranged hanging are illustrated in FIGS. 1, 3, 5 and 6.

Figure 6:
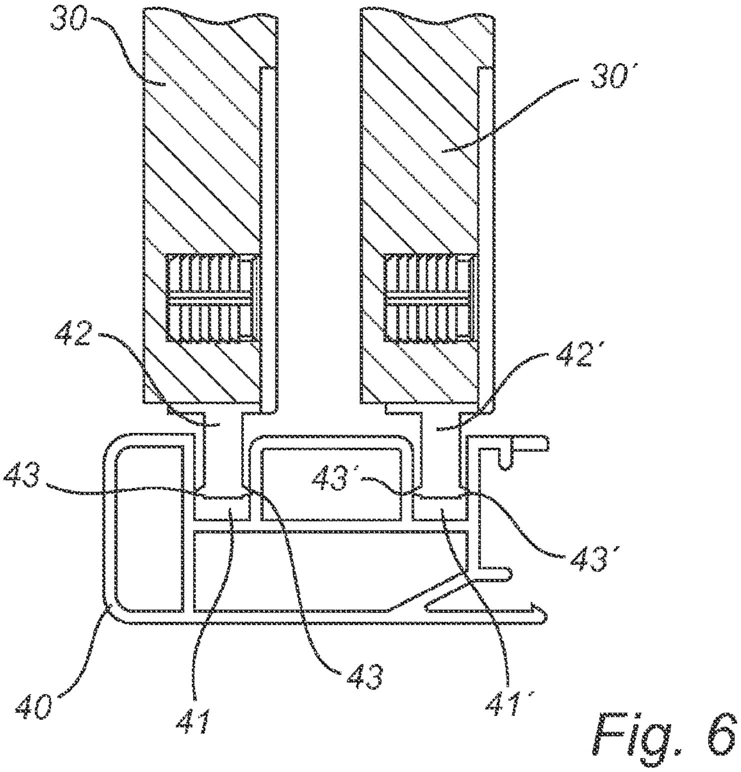
FIG. 6 depicts a linear guiding bar for sliding door arrangement.

In embodiments in which the sliding door 30;130 is to be arranged hanging from the linear slide bar 10; 110, the sliding door arrangement 2 may comprise a linear guide bar 40, illustrated in FIG. 6, to be arranged at the lower end of the sliding door 30. The linear guide bar 40 is provided with at least one guiding channel 41 extending along the longitudinal axis of the linear guide bar 40. In order to guide the sliding door 30; 130, the sliding door 30; 130 may at its lower end be provided with a guiding member 42 to be received by the guiding channel 41. The guiding channel 41 may be provided with the same type of slide layer with lowered friction as the linear slide bar 10; 110. Thus, aspects of the slide layer with lowered friction provided in relation to the linear slide bar 10; 110 are equally applicable to the linear guide bar 40. Further, also aspects provided in relation to the linear slide bar 10; 110 are equally applicable to the linear guide bar 40. Similarly, aspects of the sliding member 20; 120 provided herein are equally applicable to the guiding member 42. As an example, the guiding member 42 may be provided with protrusions 43, e.g. blades of a design that is similar to that of the blades 21, 22 described hereinbefore, extending in opposite horizontal directions to engage with corresponding vertical surfaces of the guiding channel 41 to provide lateral support for the door 30 at its lower end. Hence, the purpose of the guiding member 42 is mainly to guide the door 30 in the lateral direction, but not carrying the weight of the door 30, because the weight of the door 30 is carried by the sliding member 20. In order to guide two sliding doors 30, 30', the linear guide bar 40 may be provided with two or more guiding channels 41, 41', each co-operating with a respective guiding member 42, 42' being provided with respective horizontal and opposing protrusions 43, 43'.

According to another embodiment, a sliding door 230 is mounted standing on the linear slide bar 210. An example of the latter is illustrated in FIG. 7. In this embodiment there is provided a sliding door sliding system 201 for a sliding door 230 comprising a linear slide bar 210 having a slide surface 14 coated with a lacquer 16 comprising a resin, the lacquer 16 being in its turn at least partly coated with a lipophilic composition coating 18 to provide a slide layer 19 with lowered friction, according to principles for the slide layer described hereinbefore with reference to FIG. 1, and at least one sliding member 220. The sliding member 220 is mounted to a bottom edge 232 of the sliding door 230 by means of a pin 234. The slide bar 210 is provided with at least one hill 211, serving as a track for the sliding member 220. Preferably the slide bar 210 is however provided with at least two parallel hills 211, 211' to accommodate two parallel doors, of which only one sliding door 230 is shown in FIG. 7. Each of these hills 211, 211' extend along the longitudinal axis of the slide bar 210 and define a slide direction along the longitudinal axis of the slide bar 210. When the slide bar 210 is provided with a hill 211, the slide layer 19 is present on the hill 211.

Further, the part of the sliding member 220 arranged in contact with the slide layer is configured as a central blade 221 extending in the sliding direction and sliding on top of the hill 211. At each side of the central blade 221 there is a side blade 223 extending in the sliding direction and sliding on the sides of the hill 221. The side blades 223 act as side supports keeping the sliding member 220 in the correct position on the hill 211.

In embodiments in which the sliding door 230 is to be arranged standing on the linear slide bar 210, as described in FIG. 7, the sliding door arrangement may comprise a linear guide bar, corresponding to the linear guide bar 40 illustrated in FIG. 6 but turned upside down and arranged at the upper end of the sliding door 230. The linear guide bar is provided with at least one guiding channel similar to the guiding channel 41 and extending along the longitudinal axis of the linear guide bar. In order to guide the sliding door 230 and support the door 230 in the lateral direction, the sliding door 230 may at its upper end be provided with a guiding member similar to the guiding member 42 of FIG. 6 to be received by and co-operate with the guiding channel to provide lateral support according to principles similar, although turned upside down, to those described with reference to FIG. 6. The guiding channel may be provided with the same type of slide layer with lowered friction as the linear slide bar 210. Thus, aspects of the slide layer with lowered friction provided in relation to the linear slide bar 210 are equally applicable to the linear guide bar. Further, also aspects provided in relation to the linear slide bar 210 are equally applicable to the linear guide bar. Similarly, aspects of the sliding member 220 provided herein are equally applicable to the guiding member. As an example, the guiding member may be provided with protrusions of a design being similar to the protrusions 43 described with reference to FIG. 6

Smaller doors, such as kitchen cabinet doors, are examples of doors which may be standing on the linear slide bar 210, although also heavier doors, such as wardrobe doors and patio doors, may be arranged standing on the linear slide bar 210. Further, sliding doors 230 mounted standing on the linear slide bar 210, may not necessarily extend in the vertical plane, but may be slightly tilted with respect to the vertical plane, as is well-known for kitchen cabinet doors.

A further embodiment of the invention relates to a sliding curtain arrangement 302. A sliding curtain arrangement 302 is illustrated in FIG. 8. Such a sliding curtain arrangement 302 comprises the herein disclosed sliding system 301 and at least one sliding curtain 330. A number of sliding members 320 are arranged to support the sliding curtain 330 to allow for linear movement of the sliding curtain 330 along the longitudinal axis of the linear slide bar 310. The sliding members 320 may be made of a polymer, according to similar principles as described hereinbefore. The sliding curtain 330 is connected to the sliding members 320. The slide bar 310 may be horizontally arranged in use with the slide layer facing upwards to support the sliding members 320. As the sliding members 320 may be arranged to horizontally slide over the slide bar 310, the sliding curtain 330 may be moved in the horizontal direction along the horizontal axis of the linear slide bar 310. The curtain 330 will typically be arranged hanging from the linear slide bar 310. In use, a number of sliding members 320 are positioned within a channel 315 of the linear slide bar 310. The channel 315 is provided with a slit such that the sliding curtain 330 being present outside the channel 315 may be attached to fastening arrangements 328 extending through the slit.

Figure 8A:
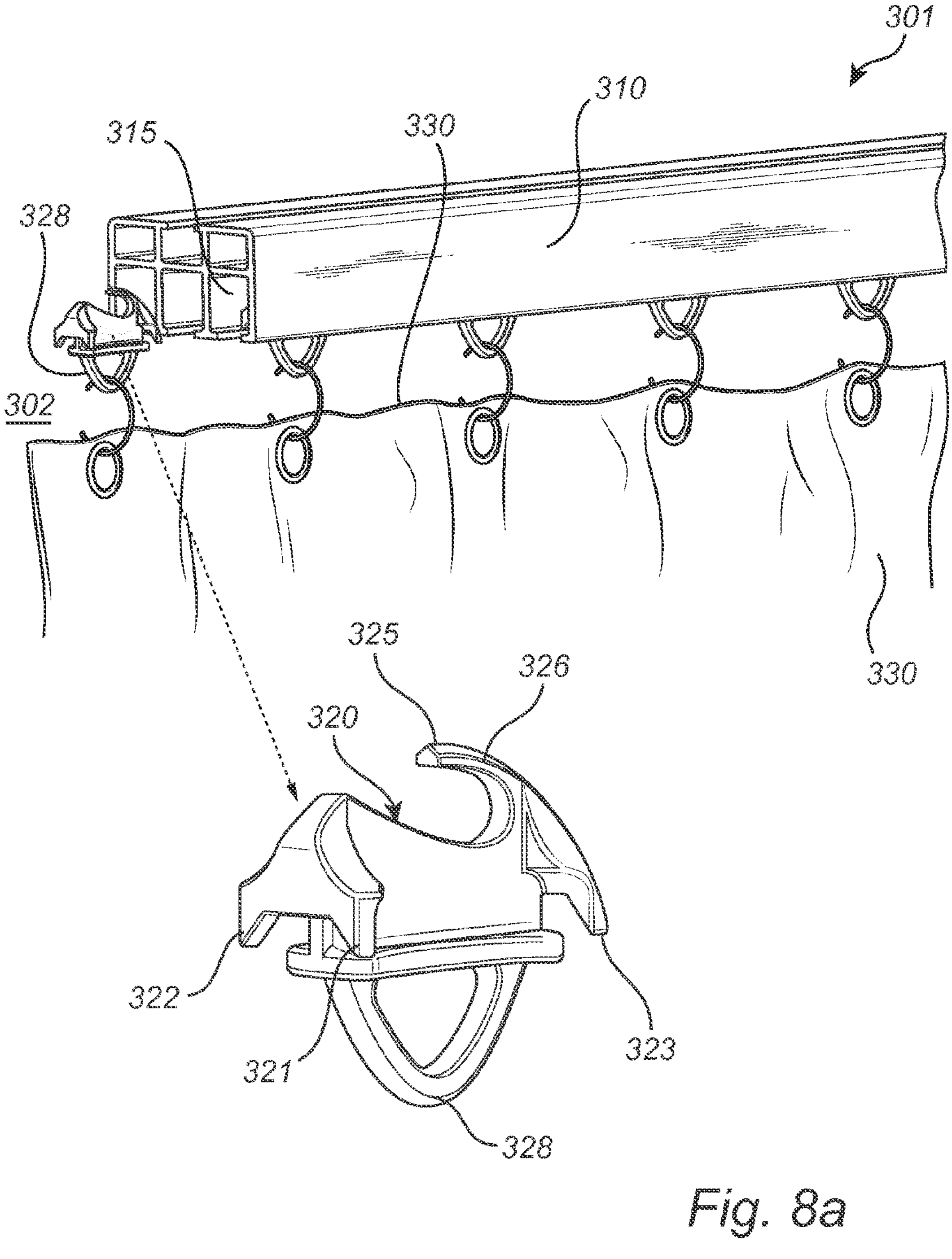
FIG. 8*a* depicts a sliding curtain sliding system according to a fourth embodiment.
Figure 8B:
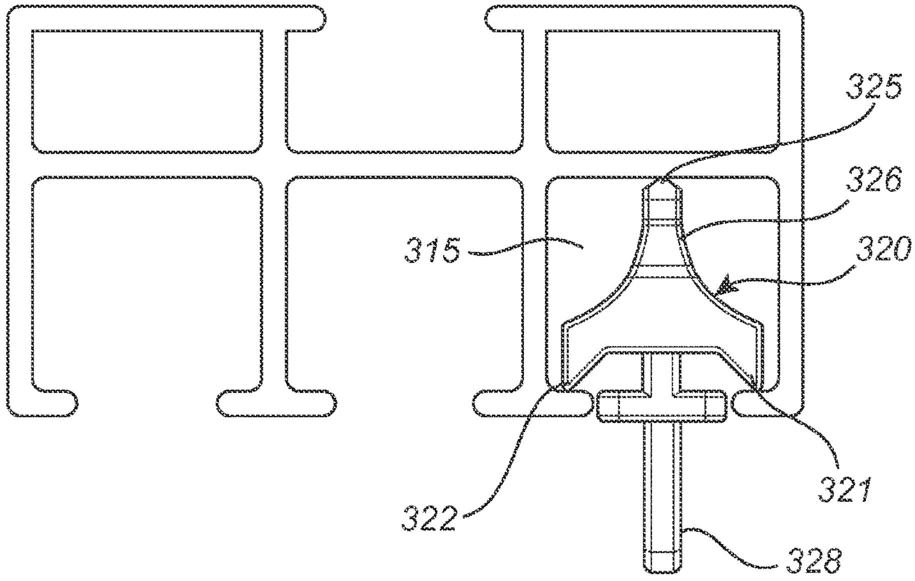
FIG. 8*b* depicts a cross-section of the sliding curtain sliding system in FIG. 8*a*.

According to an embodiment, the sliding member 320, as illustrated in FIGS. 8*a* and 8*b*, is provided with a springing pushing member 326. Further, the part(s) of the sliding member 320 to slide over the slide layer is/are configured as a blade(s) 321, 322, 323 extending in the sliding direction. The slide layer may be similar to the slide layer 19 described hereinbefore with reference to FIG. 1. In position within the channel 315, a part 325 of the pushing member 326 engages with an interior wall, which may be the upper wall, of the channel 315 such that the springing pushing member 326 is loaded, thereby pushing the blades 321, 322, and 323 against the slide surface. The pushing member 326 restricts movement of the sliding member 320 perpendicularly to the extension of the slide bar to keep the sliding member 320 in position. The part 325 of the pushing member 326 engaging with the interior wall of the channel 315 may be a blade. Given that the sliding curtain 330 typically is of low weight, it may be advantageous to provide means for keeping the sliding members 320 in position. Further, pushing the blades 321, 322, and 323 against the slide surface increases the contact pressure, whereby decreasing the friction. The low friction of the present slide bar 310 provides the hanging curtain with low start resistance, while still remaining in at a desired position at rest. This combination is hard to achieve with roll bearings and other bearings of the art.

Figure 9:
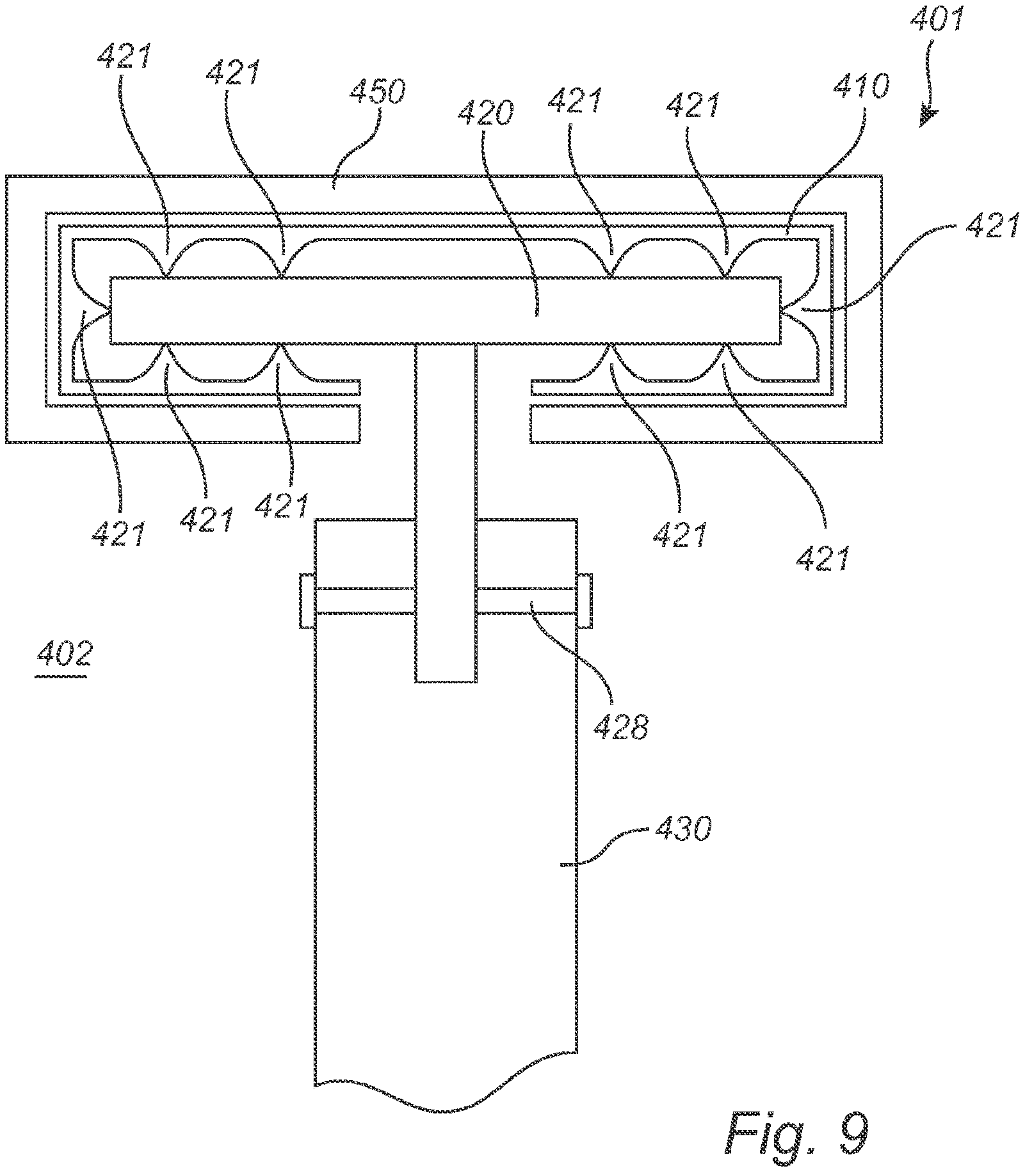
FIG. 9 depicts a cross section of a sliding screen sliding system according to an alternative embodiment.

Throughout herein, the slide layer has been described as arranged on the linear slide bar. According to an alternative embodiment illustrated in FIG. 9, the slide layer is however arranged on the sliding member 420. In such an embodiment, the sliding screen sliding system 401 comprises at least one sliding member 420 having a slide surface coated with a lacquer comprising a resin, wherein said lacquer in turn is at least partly coated with a lipophilic composition coating to provide a slide layer with lowered friction, and at least a linear slide bar 410. The linear slide bar 410 and the sliding member 420 are arranged in contact, whereby the interface between the slide layer of the sliding member 420 and the slide bar 410 forms a linear plain bearing to allow for linear movement of the sliding member 420 along the longitudinal axis of the linear slide bar 410. The sliding member 420 is provided with a fastening arrangement 428 adapted for connection to a sliding screen 430 to allow for linear movement of the sliding screen 430 along the longitudinal axis of the linear slide bar 410.

Further, in such an embodiment, the linear slide bar 410 may be a plastic profile, whereas the sliding member 420 may be lacquered metal member, e.g. an aluminum or steel member.

In such an embodiment, previous aspects described herein in relation to the lacquered linear slide bar 10; 110; 210; 310, such as aspect of the lacquer and the lipophilic composition coating, respectively, arc equally applicable to a lacquered sliding member 420. Similarly, previous aspects described herein in relation to the sliding member 20; 120; 220; 320, such as suitable materials for providing sliding member 20; 120; 220; 320, are equally applicable to a linear slide bar 410, such as a plastic profile. According to such an embodiment, the linear slide bar 410 may be a plastic profile provided with at least one ridge 421 extending along the longitudinal axis of the profile. The plastic profile may be provided with a sliding channel for the slide member 420 to slide in. At least one interior surface of the channel may be provided with a ridge 421 extending along the longitudinal axis of the channel. The plastic profile may be fitted inside a support member 450, such as a metal bar or rod, to enhance the mechanical strength of the plastic profile. The sliding system 401 is arranged in a manner such that the slide layer of the sliding member 420 engages with the ridges(s) 421 in sliding along the linear slide bar 410. Part of the sliding member 420 may be arranged to fit into the sliding channel and to engage with the ridge(s) 421 in sliding within the channel. This part may have a cross-section corresponding to, in general shape, not size, the cross-section of the channel excluding the ridge(s) 421. The plastic profile and its ridge(s) 421 may then serve to guide the sliding part 420.

Without further elaboration, it is believed that one skilled in the art may, using the preceding description, utilize the present invention to its fullest extent. The preceding preferred specific embodiments are, therefore, to be construed as merely illustrative and not limitative of the disclosure in any way whatsoever.

Although the present invention has been described above with reference to specific embodiments, it is not intended to be limited to the specific form set forth herein. Rather, the invention is limited only by the accompanying claims and, other embodiments than those specifically described above are equally possible within the scope of these appended claims, e.g. different embodiments than those described above.

In the claims, the term "comprises/comprising" does not exclude the presence of other elements or steps. Additionally, although individual features may be included in different claims, these may possibly advantageously be combined, and the inclusion of features in different claims does not imply that a combination of those features is not feasible and/or advantageous.

In addition, singular references do not exclude a plurality. The terms "a", "an", "first", "second" etc. do not preclude a plurality.

EXAMPLES

The following examples are mere examples and should by no means be interpreted to limit the scope of the invention, as the invention is limited only by the accompanying claims.

General

All chemicals were obtained from Sigma-Aldrich. In providing mixtures, e.g. palmitic acid 10 mass % in liquid paraffin, the two compounds (e.g. 3 g palmitic acid and 27 g liquid paraffin) were mixed under heating to melt the mixture. Further, the mixtures were applied to the slide bar before solidifying.

Figure 10:
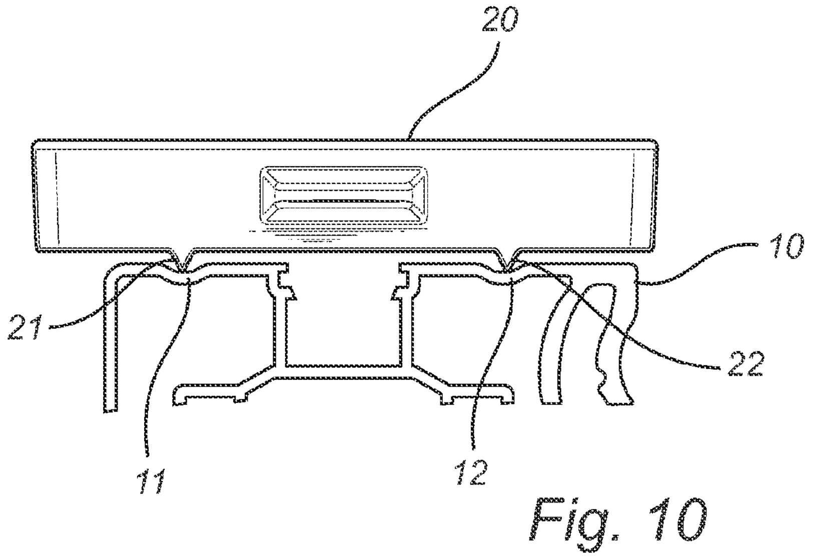
FIG. 10 depicts a cross section of a sliding system used for friction tests.
Figure 11:
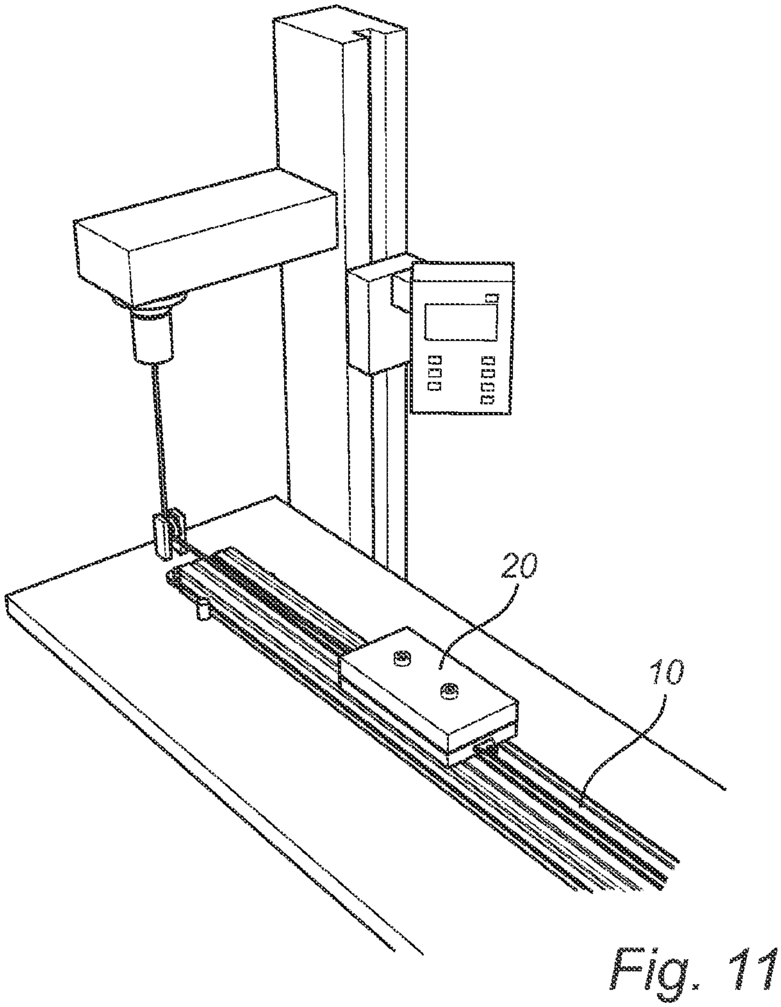
FIG. 11 is an illustration outlining an arrangement for performing friction tests.

The test procedure used was based on SS-EN 14882:205. In short, a sled with parallel plastic blades (four in total; two along each longitudinal slide axis) of POM was positioned on an anodized aluminum profile (cf. FIG. 10) having been anaphoretically coated with an acrylic resin and subsequently heat cured to provide a lacquered slide surface. Aluminum profiles lacquered in this way are for example provided by Sapa Profiler AB, 574 38 Vetlanda, Sweden, and are marketed under the trade name SAPA HM-white, the materials being produced using the Sapa HM-white method which is based on the above referenced Honny method. In the friction measurements (cf. FIG. 11), the sled was pulled over the slide bar at a constant speed of 500 mm/min and the force necessary to pull the sled was registered using an Instron 5966 tension testing system. The total weight of the sled corresponds to 10 N. Fresh profiles were used for each lipophilic composition, as the lipophilic compositions cannot be removed once applied. However, the profiles were re-used after the control experiments (no lipophilic compositions applied), washing and ageing, respectively.

Example 1

By using the test procedure described above, the resulting friction from application of various lipophilic compositions to anodized, lacquered aluminum profiles was determined. The resulting dynamic friction, mean value from three test sequences, was registered and compared to the dynamic friction for anodized aluminum profiles provided with a lacquer but not coated with any lipophilic composition (=control). The results are provided in Table 1 and 2 below.

TABLE 1

Fatty acids in liquid paraffin

| Lipophilic composition | Wash | Ageing | Dynamic friction Mean (n = 3) |
|---|---|---|---|
| No (control) | — | — | 0.214 |
| MA5% | — | — | 0.049 |
| MA10% | — | 3 days | 0.046 |
| MA30% | — | — | 0.049 |
| MA10% | Yes | — | 0.041 |
| PA10% | — | 3 days | 0.047 |
| PA10% | Yes | — | 0.042 |
| SA10% | — | 3 days | 0.050 |
| SA10% | Yes | — | 0.044 |
| LP | — | — | 0.053 |
| LP | Yes | — | 0.050 |

MA5%/10%/30% = Myristic acid 5/10/30 mass % in liquid paraffin
PA10% = Palmitic acid 10 mass % in liquid paraffin
SA10% = Stearic acid 10 mass % in liquid paraffin
LP = Liquid paraffin

TABLE 2

Triglycerides in liquid paraffin

| Lipophilic composition | Wash | Ageing | Dynamic friction Mean (n = 3) |
|---|---|---|---|
| No (control) | — | — | 0.214 |
| TM10% | — | — | 0.0510 |
| TM10% | Yes | — | 0.0524 |
| TP10% | — | 3 days | 0.0454 |
| TP10% | — | 6 weeks | 0.0513 |
| TP10% | Yes | — | 0.0440 |
| TS10% | — | — | 0.0524 |
| TS10% | Yes | — | 0.0504 |
| LP | — | — | 0.053 |
| LP | Yes | — | 0.050 |

TM10% = Trimyristate 10 mass % in Liquid paraffin
TP10% = Tripalmitate 10 mass % in Liquid paraffin
TS10% = Tristearate 10 mass % in Liquid paraffin
LP = Liquid paraffin

TABLE 3

| Fatty acids in liquid paraffin | | |
|---|---|---|
| Lipophilic composition | Wash | Dynamic friction Mean (n = 3) |
| LP | — | 0.054 |
| LP | Yes | 0.042 |
| LA10% | — | 0.058 |
| LA10% | Yes | 0.041 |
| LA30% | — | 0.046 |
| LA30% | Yes | 0.039 |
| LA50% | — | 0.048 |
| LA50% | Yes | 0.036 |
| LA70% | — | 0.041 |
| LA70% | Yes | 0.036 |
| Coconut oil | — | 0.033 |
| Coconut oil | Yes | 0.037 |

LA10/30/50/70% = Lauric acid 10/30/50/70 mass % in Liquid paraffin

As can be seen from Table 1 and 2, the resulting dynamic friction was reduced by about 75% by applying a lipophilic compositions to the anodized aluminum profiles, though the initial dynamic friction of the un-coated anodized aluminum profiles was not that high. Furthermore, whereas the dynamic friction remained low and nearly the same for the coated profiles over repeated cycles, the dynamic friction for un-coated anodized aluminum profiles was significantly increased (seizing) already after less than 20 test cycles.

It can also be seen from the above tables 1 and 2 that the tests including fatty acids or triglycerides resulted in a somewhat lower friction compared to pure Liquid paraffin, in particular when the fatty acid is myristic acid or palmitic acid, and when the triglyceride is tripalmitate. Coconut oil, being a mixture of various triglycerides, in which lauric acid is the most common fatty acid residue, provided very low friction (cf. Table 3). Further, neither ageing nor washing (wiping by a wet cloth 6 times, followed by wiping 4 times with a dry cloth) had any significant effect on the dynamic friction.

Example 2

By using the test procedure described above, the resulting friction at various loads (5, 10 and 20 N, respectively) using liquid paraffin as the lipophilic composition coating was determined. Increasing the load did not result in increased friction. On the contrary, the lowest load (5 N) displayed the highest friction (friction value 0.052 (at 5N) vs. friction value 0.045 (at 10 N)/0.046 (at 20 N)).

Example 3

In an additional experiment, a corresponding aluminum bar, but without any lacquer, was used. Use of palmitic acid 10 mass % in liquid paraffin as lubricant on the non-lacquered bar resulted in a dynamic friction of 0.1132, i.e. more than 100% higher than corresponding dynamic friction obtained with the lacquered aluminum bar (cf. Table 1; 0.042 and 0.047, respectively).

Example 4

In additional examples also steel profiles as well as other lacquers were evaluated.

Lacquers: Teknotherm 4400 (Teknos)—wet spray lacquer, Standofleet® (Standox) wet spray lacquer, Powercron® 6200HE (PPG)—cationic epoxy electrocoat, Interpon AF (AkzoNobel)—powder coating, and Alesta (Axalta)—powder coating.

TABLE 4

| Coconut oil on aluminum and steel profiles | | | | |
|---|---|---|---|---|
| Lacquer | Profile | Dynamic friction Mean (n = 3) | Profile | Dynamic friction Mean (n = 3) |
| Teknotherm | Al | 0.040 | Fe | 0.050 |
| Standofleet | Al | 0.045 | Fe | 0.048 |
| Interpon AF | Al | 0.024 | Fe | 0.034 |
| Powercron | Al | 0.021 | Fe | 0.041 |
| Alesta | Al | 0.025 | Fe | 0.038 |

As can be seen from Table 4, the aluminum profiles displayed lower friction than the steel profiles though also the steel profiles displayed a very low friction. Further, whereas some of the alternative lacquers displayed comparable or lower friction than the SAPA HM-white profiles (dynamic friction mean: 0.033), the wet lacquered profiles displayed slightly higher friction. Without being bond to any theory, this may be due to wet lacquered profiles inherently having somewhat thicker lacquer and/or varying thickness of the lacquer. Further, in comparing coconut oil and liquid paraffin (data not shown) it was seen that coconut oil generally provided somewhat lower friction.

Example 5

Tests were also performed in a full-scale test rig using a wardrobe door with a weight of 8.5 kg and using two sliding members 20 and a slide bar 10 of the type described hereinabove with reference to FIG. 1. When applying a lipophilic composition coating comprising 100% Liquid paraffin to the lacquer of the slide bar 10 the wardrobe door could still be moved back and forth without problems and at still a low friction after 500 000 cycles of reciprocation of the wardrobe door. In a comparative test the same equipment was used, but without any lipophilic composition coating being applied on the lacquer. In the latter case the tests had to be stopped already after less than 30 cycles as the test equipment was about to break down due to rapidly increasing friction between the sliding members and the slide bar (seizing).

The invention claimed is:

1. A sliding screen sliding system, comprising a linear slide bar having a slide layer with lowered friction, and at least one sliding member, wherein the linear slide bar and the sliding member are arranged in contact, whereby the interface between the slide layer of the slide bar and a part of the sliding member being in contact with the slide layer forms a linear plain bearing to allow for linear movement of the sliding member along the longitudinal axis of the linear slide bar, the sliding member being provided with a fastening arrangement adapted for connection to a sliding screen to allow for linear movement of the sliding screen along the longitudinal axis of the linear slide bar, and wherein at least the part of said sliding member being in contact with the slide layer is made of a plastic, and wherein the part of said sliding member to slide over the slide layer is configured as a blade extending in the sliding direction, wherein the sliding member comprises at least one individual contact point in contact with the slide bar at the interface between the slide bar and the sliding member, the contact area of each individual contact point being less than 3 $mm^2$.

2. The sliding system according to claim 1, wherein said sliding system comprises at least two sliding members, wherein the interface between the slide layer of the slide bar and each of the sliding members forms a linear plain bearing to allow for linear movement of the sliding members along the longitudinal axis of the linear slide bar.

3. The sliding system according to claim 1, wherein the slide layer is present in a groove extending along the longitudinal axis of the slide bar;

or wherein the slide layer is present on a hill extending along the longitudinal axis of the slide bar.

4. The sliding system according to claim 1, wherein the contact pressure in said at least one contact point is at least 4 $N/mm^2$.

5. The sliding system according to claim 1, wherein the linear slide bar has two parallel slide layers, the first slide layer extending along a first longitudinal axis of the slide bar, and the second slide layer being parallelly displaced in relation to the first slide layer and extending along a second longitudinal axis of the slide bar, wherein the part of said sliding member to slide over the slide layers is configured as two parallel, displaced blades extending in the sliding direction and arranged along different longitudinal axes.

6. The sliding system according to claim 1, wherein the slide bar is an aluminum or steel bar.

7. The sliding system according to claim 1, wherein the slide layer is coated with a lipophilic composition coating.

8. The sliding system according to claim 7, wherein the lipophilic composition coating coated on the slide layer comprises at least 25 wt. %, of compounds comprising C6 to C40 alkyl groups.

9. The sliding system according to claim 8, wherein the lipophilic composition coating coated on the slide layer comprises at least 25 wt. % C6 to C40 non-aromatic hydrocarbons.

10. The sliding system according to claim 7, wherein the lipophilic composition coating comprises triglycerides and/or fatty acids.

11. The sliding system according to claim 10, wherein the lipophilic composition coating comprises 1 to 40 wt. %, or at least 25 wt. %, triglycerides and/or fatty acids.

12. The sliding system according to claim 1, wherein at least the part of said sliding member in contact with the slide layer is made of a plastic comprising a polymer selected from the group of polymers consisting of polyoxymethylenes (POM), polyesters, polyethylene terephthalate (PET), polyamides (PA), polyvinyl chloride (PVC), polyphenylene sulfide (PPS), polyaryletherketone (PAEK), and Polytetrafluoroethylene (PTFE).

13. The sliding system according to claim 1, wherein said sliding member is in its entirety made from a plastic.

14. A sliding screen arrangement comprising:

a sliding system comprising a linear slide bar having a slide layer with lowered friction, and at least one sliding member, wherein the linear slide bar and the sliding member are arranged in contact, whereby the interface between the slide layer of the slide bar and a part of the sliding member being in contact with the slide layer forms a linear plain bearing to allow for linear movement of the sliding member along the longitudinal axis of the linear slide bar, wherein at least the part of said sliding member being in contact with the slide layer is made of a plastic, and wherein the part of said sliding member to slide over the slide layer is configured as a blade extending in the sliding direction, wherein the sliding member comprises at least one individual contact point in contact with the slide bar at the interface between the slide bar and the sliding member, the contact area of each individual contact point being less than 3 $mm^2$; and a sliding screen, wherein the sliding member being provided with a fastening arrangement adapted for connection to the sliding screen to allow for linear movement of the sliding screen along the longitudinal axis of the linear slide bar, and wherein said sliding member is arranged to support the sliding screen to allow for linear movement of the sliding screen along the longitudinal axis of the linear slide bar, and wherein the sliding screen is arranged hanging from the linear slide bar, or wherein the sliding screen is a sliding door which is arranged standing on the linear slide bar.

15. The sliding screen arrangement according to claim 14, wherein the sliding screen is arranged hanging from the linear slide bar, and wherein the sliding screen arrangement comprises a linear guide bar to be arranged at the lower end of the sliding screen, the linear guide bar being provided with a guiding channel extending along the longitudinal axis of the linear guide bar, wherein said guiding channel is to receive a guiding member arranged at the lower end of the sliding screen.

16. The sliding screen arrangement according to claim 14, wherein the sliding screen is a sliding door which is arranged standing on the linear slide bar, and wherein the linear slide bar is provided with a hill extending along the longitudinal axis of the slide bar and defining a slide direction along the longitudinal axis of the slide bar.

17. The sliding screen arrangement according to claim 16, wherein the sliding screen arrangement comprises a linear guide bar to be arranged at the upper end of the sliding door, the linear guide bar being provided with a guiding channel extending along the longitudinal axis of the linear guide bar, wherein said guiding channel is to receive a guiding member arranged at the upper end of the sliding door.

18. A sliding screen sliding system, comprising at least one sliding member having a slide surface with lowered friction, and a linear slide bar, wherein the linear slide bar and the sliding member are arranged in contact, whereby the interface between sliding member and the linear slide bar forms a linear plain bearing to allow for linear movement of the sliding member along the longitudinal axis of the linear slide bar, the sliding member being provided with a fastening arrangement adapted for connection to a sliding screen to allow for linear movement of the sliding screen along the longitudinal axis of the linear slide bar, wherein the linear slide bar is a plastic profile, wherein the plastic profile is provided with a ridge extending along the longitudinal axis of the profile, wherein the linear slide bar comprises at least one individual contact point in contact with the sliding member at the interface between the slide bar and the sliding member, the contact area of each individual contact point being less than 3 $mm^2$.

19. The sliding system according to claim 18, wherein the slide surface is coated with a lipophilic composition coating.

20. The sliding system according to claim 18, wherein the plastic profile is provided with a sliding channel for the slide member to slide in, at least on interior surface of the channel being provided with the ridge extending along the longitudinal axis of the plastic profile.

* * * * *